United States Patent [19]

Hawelka et al.

[11] Patent Number: 4,683,976
[45] Date of Patent: Aug. 4, 1987

[54] SERVICE VEHICLE

[75] Inventors: Walter Hawelka, Linz; Hermann Staudinger, Neuhofen, both of Austria

[73] Assignee: Konrad Rosenbauer KG, Leonding, Austria

[21] Appl. No.: 733,515

[22] Filed: May 13, 1985

[30] Foreign Application Priority Data

May 18, 1984 [AT] Austria ................................. 1642/84
Dec. 6, 1984 [AT] Austria ................................. 3870/84

[51] Int. Cl.[4] ............................................. A62C 27/16
[52] U.S. Cl. ........................... 180/311; 180/53.1; 180/70.1; 180/233; 180/291; 280/781
[58] Field of Search ............... 280/405 R, 406 R, 407, 280/446, 494, 781, 786; 180/311, 70.1, 900, 53.1, 312, 233; 296/203, 204

[56] References Cited

U.S. PATENT DOCUMENTS

| 1,926,928 | 9/1933 | Yost et al. | 180/291 |
| 1,936,318 | 11/1933 | Windberger | 180/291 |
| 2,796,140 | 6/1957 | Knolle | 180/311 |
| 3,101,150 | 8/1963 | Janson et al. | 180/291 |
| 3,194,335 | 7/1965 | Yué | 180/291 |
| 3,455,404 | 7/1969 | Hansen | 180/291 |
| 3,889,782 | 6/1975 | Geis | 180/291 |
| 4,267,895 | 5/1981 | Eggert, Jr. | 180/291 |
| 4,289,214 | 9/1981 | Spence | 180/311 |
| 4,484,656 | 11/1984 | Bird | 180/291 |

FOREIGN PATENT DOCUMENTS 541369 11/1941 United Kingdom .
885689 12/1961 United Kingdom .

Primary Examiner—Richard A. Bertsch
Attorney, Agent, or Firm—Kurt Kelman

[57] ABSTRACT

A chassis frame particularly suitable for fire service vehicles comprises a pair of main bearers extending longitudinally and spaced transversely of the vehicles, each including at least one angled portion suitably disposed between the front and rear axles and enclosing an obtuse angle of less than 180° towards the wheels. Engine mounting means are situated rearwardly of the front axle and an engine output shaft is positioned above the axle and between the axles and upper portions of the wheels. This facilitates adaptation to different service vehicle requirements, the installation of drive transmissions and service equipment such as fire fighting equipment whilst allowing for ease of access and flexibility in use.

22 Claims, 13 Drawing Figures

SERVICE VEHICLE

BACKGROUND OF THE INVENTION

1. Field of the invention

The invention relates to a service vehicle, in particular but not exclusively to a fire service vehicle, comprising an uninterrupted vehicle frame having at least one main bearer extending in the longitudinal direction of the vehicle, which accommodates at least two driving axles spaced apart in longitudinal direction from each other, a driving engine, a driver's cab, transmissions and other ancillary equipment for example a fire extinguisher pump.

2. Description of the Prior Art

Different chassis frames are already known for service vehicles, in particular for fire service vehicles and amongst other things, it is known that the driving engine for propulsion of such vehicles may be installed between continuous stringers and substantially above these in the region above the front driving axle or in front of the front driving axle or in the region of the rear driving axles or behind these rear driving axles. Above all, it is only with difficulty in the case of existing chassis frames, which derive from the production of series chassis frames for conventional commercial vehicles, such as tippers, long-distance cargo vehicles or the like, to adapt these by uncomplicated means to the different service requirements and conditions of special service vehicles. These conventional chassis frames manufactured in series commonly require extensive adaptation and reconstruction work, in order to comply approximately to the requirements specified in the sphere of service vehicles.

In another known chassis frame for a fire service vehicle—corresponding to the research report of the Federal Minister for Research and Technology of the Federal Republic of Germany regarding optimised life-saving and firefighting with integrated technical assistance of July 1978, also referred to as an "Orbit" study—the driving engine for the 4×4 vehicle (two axles having single wheels in each case and all wheels being driven) is arranged substantially above the front driving axle. Its drive output is positioned on an upper margin of the chassis frame structure. This arrangement obstructs access to the driving engine, since accessibility from beneath is made difficult by the driving axle, the axle transmissions and the drive shafts. At the same time, the vibrations as well as the waste heat of the driving engine are transmitted into the superjacently situated driver's cab, thereby increasing the stress on the service personnel which is already substantial in the course of an operational trip.

It is already known that the mounting devices for a driving engine may be installed between the two driving axles of a chassis frame—in accordance with GB-A-885 689. The driving engine is suspended from above between the two main bearers of the chassis frame structure, so that its upper portion is situated below the upper margins of the main bearers of the chassis frame structure. Although an advantageous position of the centre of gravity of the engine on the chassis frame structure is obtained thereby, it is hardly possible however to maintain the required ground clearance since the drive output of the driving engine is substantially already at the same level or below that of the axle centre of the driving axles. In particular, the incorporation of the distributor gearbox is rendered difficult.

OBJECTS AND SUMMARY OF THE INVENTION

It is an object of the invention to provide a chassis frame for service vehicles, which is universally applicable and allows for manifold possibilities of variation regarding the desirable propulsion method, the position of the centre of gravity and the superstructures.

According to the invention a service vehicle comprises an uninterrupted vehicle framework having at least one main bearer extending in the longitudinal direction of the vehicle, which accommodates at least two driving axles spaced apart in the longitudinal direction of the vehicle, a driving engine, a driver's cab, transmissions and other ancillary equipment, in which the main bearer is formed with an angled portion and the driving engine is situated on the chassis frame between a stern of the service vehicle and a region present between the driving axles and an auxiliary unit is mounted on the chassis frame in the region of the front driving axle.

The surprising advantage of this solution appearing to be comparatively uncomplicated, consists in that it is made possible to organise the propulsive system, i.e. the driving engine—auxiliary unit—transmission arrangement and the incorporation of a front axle, rear axle, all-wheel drive or the steering of the front or rear axle or both axles at will whilst nevertheless providing an advantageous centre of gravity and a great freedom of choice in varying the installation of the other items of equipment of a service vehicle.

According to one aspect of the invention an auxiliary unit is installed on a portion of the chassis frame projecting forwardly in the direction of travel over the front driving axle and forwardly of an angled portion.

An advantageous load distribution is obtained with a centre of gravity advantageous for propulsion. Access to the auxiliary unit, and for example if this is an extinguisher fluid pump, the connection of the separate extinguisher fluid lines from the end of the vehicle, are facilitated and other service vehicles upon being driven past are not obstructed by lateral pipes projecting from the vehicle. Moreover a mechanic for the auxiliary unit may stay in the driver's cab to monitor its operation. This secures better working conditions for the mechanic since he may stay in the driver's cab under protection against bad weather during a protracted operational period and concentrate wholly on the functionality of the auxiliary unit, e.g. in the case of an extinguisher fluid pump, admixing foaming agents or the like by means of remote control elements. Furthermore, improved communication with the other service units may be secured by radio thanks to improved noise damping within the driver's cab. It is possible to provide the service vehicle at will with a front-wheel drive, rear-wheel drive or all-wheel drive. A further advantage consists in that the auxiliary unit may be installed within the confines of the vehicle and is thus protected against damage.

Suitably the chassis frame is formed by main bearers extending in the longitudinal direction of the vehicle and spaced apart transversely to the direction of travel, and which in the region of the front driving axle have the angled portion whereby the main bearer section extending forwardly from the angled portion extends forwardly from the front driving axle downwardly at an angle towards a wheel support plane.

This arrangement provides for advantageous ground clearance in the region of the driver's cab. It is possible by cranking the bearers in the area behind the front driving axle to make available appropriate space between the two main bearers or under the two main bearers, so that the engine may be secured on the chassis frame by means of mounting devices at the required vertical position, and the position of the main bearers may furthermore be adapted at will for reception of the different items of equipment, for example of the extinguisher fluid pump of a tank and the like.

Advantageously the main bearers are arranged in a plane substantially parallel to a wheel support plane of the wheels and sections extending forwardly of the angled portions from rearwardly of the front wheels and over the front axle have a smaller transverse spacing than sections of the main bearers rearwardly of the angled portions.

Sufficient space is thereby made available in the region of the front driving axle to obtain a small turning circle and at the same time, it is provided that the drive output of a driving engine immediately adjacent to the front driving axle may extend into the space below the upper margin of the chassis frame. A further advantage of this arrangement is that the chassis frame is wider in the region of the rear driving axle than at the front and the wider support area may support an extinguishing agent pump or an extinguishing agent tank, also a wider support area is obtained for superstructures.

The chassis frame structure may be formed by main bearers extending longitudinally and spaced transversely of the vehicle, the main bearers being formed with respective angled portions disposed between the front and rear axles and extending transversely of a longitudinal direction of the main bearers.

Suitably the angled portions extend lengthwise, widthwise and heightwise in relation to the vehicle. This arrangement of the main bearers provides in simple manner the possibility to install the driving engine and the equipment cab or the module receiving the equipment at as low as possible a position, thereby securing satisfactory lateral stability and centre of gravity position. Also, the accessibility of the items of equipment and their stowage, are facilitated or simplified.

The main bearers may be arranged to overbridge a section between the front and rear driving axles in the manner of a portal, and for example equipment modules, extinguishing agent tanks or the like suspended from the portal may be simply unloaded at the point of operational application and the unloaded chassis may then be utilised for replenishment drives or for fetching different items of equipment.

According to an embodiment, chassis frame members situated at either side of the angled portions subtend an angle smaller than 180° facing towards the wheels whereby an advantageous force transmission is obtained in the chassis frame.

Suitably mounting means for the driving engine are situated rearwardly of the front axle and an output shaft of the engine is positioned above the driving axles and between the axles and upper portions of the wheels. Advantageously the mounting means for the engine are situated between the front and rear axles.

An advantageous relation is obtained between the requirements in respect of the position of the centre of gravity and the accessibility of the engine and a substantially unhampered possibility of variation for different superstructures on service vehicles of this nature is obtained. Satisfactory accessibility from the top as well as from the bottom of the driving engine is assured, which is substantially unimpeded by the axle drives or intermediate gearboxes or the like. At the same time, the appropriate vertical position allows for driving both axles via drive shafts by means of a central power-drive transmission, and thereby of providing an all-wheel drive whilst securing an appropriate ground clearance. Another positive aspect of this solution consists in that the driving engine hardly affects the driver's cab and thus the service personnel by vibrations, noise generation or thermal radiation. A substantially universally applicable basic structure of the chassis frame is obtained, which may be adapted in an uncomplicated manner for different operational purposes of a service vehicle, and which is satisfactory for service vehicles.

It is also possible however within the scope of the invention that the mounting means for the driving engine are installed in sections of the main bearers rearwardly of the angled portions and that the output shaft of the driving engine and that of the gearbox are transversely spaced apart from and on opposite sides of a longitudinal axis of the vehicle by approximately the same amount. The distribution of the driving forces to the separate driving axles, and the incorporation of the drive shafts, are facilitated by this positioning of the drive outputs.

An embodiment of the invention is particularly advantageous, in which the main bearers of the chassis frame project in the direction of travel over the front driving axle and that fastenings for an auxiliary unit are situated in this region, and the main bearers have portions projecting rearwardly over the rear driving axle and which provide supporting means for the driving engine.

An approximately symmetrical loading of the chassis frame and thus an advantageous load distribution is obtained with respect to the driving axles, by installing the auxiliary unit in an area of the chassis frame projecting over the front axle and installing the driving engine in an area of the chassis frame projecting over the rear axle. Access for servicing and repair of the driving engine is simplified by direct access from the stern side of the service vehicle. The possibility is created of providing an extinguisher fluid tank in the region between the two axles, that is to say as close as possible to the centre of gravity of the service vehicle, thereby complementarily improving cornering capability. It is possible to avoid the need for costly tippable driver's cabs.

It is advantageous furthermore, if the gearbox and intermediate gearbox form a compact transmission module, the transmission module having two output drives extending in the longitudinal direction of the vehicle in opposite directions, as well as a power take-off pointing in the direction of the front driving axle and the transmission module is installed on the chassis frame between the two driving axles, whereby a central propulsion force distribution may be obtained and the service vehicle may optionally be equipped with front-wheel drive, rear-wheel drive or all-wheel drive.

In accordance with the invention, it is also possible to provide a service vehicle in which the transmission module comprises a shift-gear transmission, a converter transmission and an inter-axle gearbox integrated therein and having a differential lock, the power take-off being arranged approximately in rectilinear extension of the transmission input shaft coupled to the driving engine, and the axle drives being situated in a plane displaced in the direction of the wheel support plane, an electromagnetic clutch being installed between the main gearshaft and the PTO (power take-off).

As a result the space requirement between the drive input and output may be kept very small, and a complementary intermediate transmission between the shift-gear transmission and the inter-axle transmission is unnecessary.

It is also possible according to the invention to provide that the transmission module, the transmissive connections to the driving engine, the auxiliary unit and the driving engine, are situated between the two main bearers of the chassis frame which are spaced apart from each other transversely to the longitudinal direction of the vehicle.

The space above the upper margins of the chassis frame is thus wholly kept free for superstructures and servicing is simplified by access to the drive elements from below. Moreover, the space outside the main bearers remains free for superstructures, so that superstructures projecting laterally and downwardly beyond the main bearers, for example such as tanks and the like, may be placed on the main bearers.

Provision may be made according to another embodiment of the invention that the auxiliary unit is displaceably mounted for displacement with respect to the main bearers and in an intermediate frame located on the main bearers, and is arranged for displacement from a stowed position within the external delimitation of the vehicle, into an operational position extending at least partially beyond the external vehicle delimitation.

An uncomplicated positioning of the auxiliary unit within and outside the vehicle confines adapted to different operational requirements is thereby obtained by uncomplicated means and without any need for dismantling. A rapid replacement of defective auxiliary units is made possible which is of great importance so that service readiness may be assured at all times.

Suitably the transmission output drive for the front and rear driving axles as well as the associated power transmission devices and the inter-axle transmissions are each constructed for transmission of the total torque of the transmission output of the engine. It is thus possible in an uncomplicated manner for a service vehicle to select the drive method corresponding in optimum degree to driving conditions, namely front-wheel drive, rear-wheel drive or all-wheel drive.

It is advantageous if the front and rear driving axles each have two wheels and are suspended on the chassis frame by means of leaf springs, since the support surface available may thereby be exploited satisfactorily for transmission of frictional forces and a large support surface may be obtained. Satisfactory lateral location of the axles may be obtained by installing leaf springs between the main bearers and the axles.

It is also advantageous if both driving axles are supported on the chassis frame structure via fluidoperated and spring elements, a venting and charging valve being situated between a pressure-fluid supply system and the spring elements being operatively coupled with several actuating members distributed about the vehicle.

It is thus made possible upon taking bends at high speed to tip the body around its longitudinal axis against the action of centrifugal force by appropriate application of pressure to the spring elements, and it is also possible to adapt the distance of the bodywork or of the chassis frame from the wheel support plane to the different operational conditions such as travel on metalled roadways or cross-country travel or stoppage during utilisation. By lowering the chassis frame structure during operation, the overall height of the vehicle may be reduced, and access to the items of equipment may also be facilitated. If several actuator units are distributed about the outside of the vehicle for actuation of the venting and filling valves and of the spring elements, the required position of the chassis frame structure with respect to the wheel support plane may be established notwithstanding the momentary station of the operative.

In an embodiment carrier framework is arranged rearwardly of forward angled portions of the bearers generally in a plane extending transversely to the longitudinal direction of the vehicle and at right angles to the wheel support plane, whereby it is possible for the space between the main bearers to be kept unoccupied for installation of equipment or for the drive shafts or the power-drive transmission and the like. The items of equipment which commonly have a large volume but are not very heavy may be positioned above the chassis frame structure.

Suitably disc brakes comprising brake discs situated within an oil bath are installed on the driving axles to allow for full exploitation of the driving speeds, especially on curved sections, but also on straight stretches of road, whilst nevertheless maintaining uniform deceleration irrespective of the number of braking actions.

In an advantageous arrangement a transverse impact guard is fastened to the main bearers in the region of the chassis frame situated rearwardly of the rear driving axle, and the impact guard is displaceable around an axis generally at right angles to the support plane to extend in a longitudinal direction of the vehicle.

It is thereby possible to install items of equipment as low as possible on the chassis frame structure, or to provide an extinguishing fluid pump which is easily accessible and has a lesser access height. These items of equipment installed at a low level are still protected against damage by the impact guard which may be removed in an operational situation, to establish accessibility.

A trailer coupling is suitably situated on a transverse bearer of the impact guard.

Suitably a securing device for a fire extinguisher pump is arranged in pendant manner on a frame member which is vertically displaceable with respect to the chassis frame, whereby the vertical operational positioning of the extinguishing fluid pump is not adversely affected by the chassis frame height.

The invention also includes a chassis frame for service vehicles comprising an uninterrupted vehicle framework which has at least one main bearer extending in the longitudinal direction of the vehicle, which accommodates two driving axles spaced apart from each other in longitudinal direction, a driving engine, a driver's cab, transmissions and other ancillary equipment, in which the main bearer is formed with an angled portion and that frame members situated at either side of the angled portion subtend an angle facing the wheels which is smaller than 180°.

The invention further includes a service vehicle having a chassis frame, forward and rearward driving axles and a drive arrangement comprising a driving engine which is transmissively coupled to an auxiliary unit e.g. an intermediate transmission and a power take-off in which the driving engine is situated on the chassis frame between a stern of the service vehicle and a section situated between the driving axles and the auxiliary unit is installed on the chassis frame in the region of the forward driving axle.

BRIEF DESCRIPTION OF THE DRAWINGS

The invention will now be described, by way of example, with reference to the accompanying partly diagrammatic drawings, in which.

DETAILED DESCRIPTION OF PREFERRED EMBODIMENTS

Figure 1:
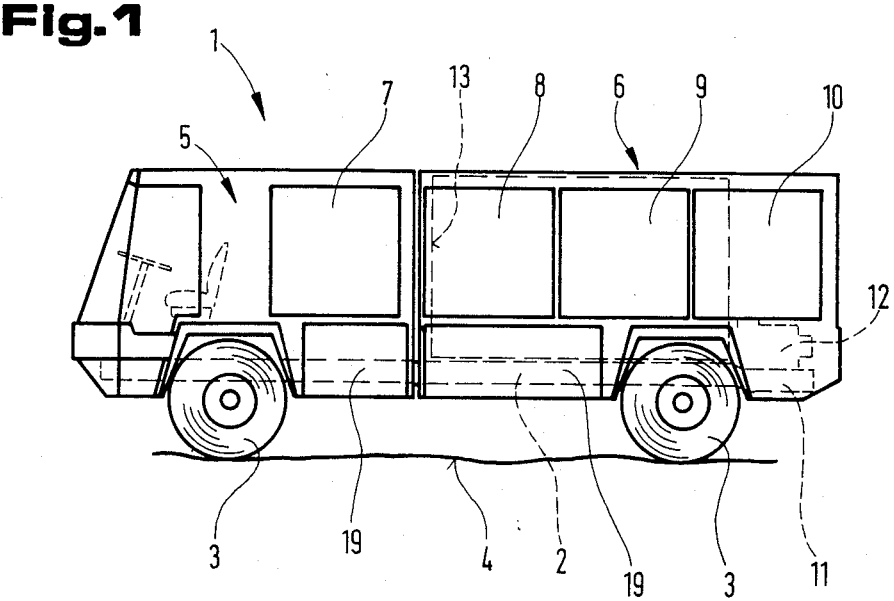
FIG. 1 is a diagrammatic side elevation of a service vehicle with a chassis frame and with a driving engine arranged generally centrally thereon.
Figure 2:
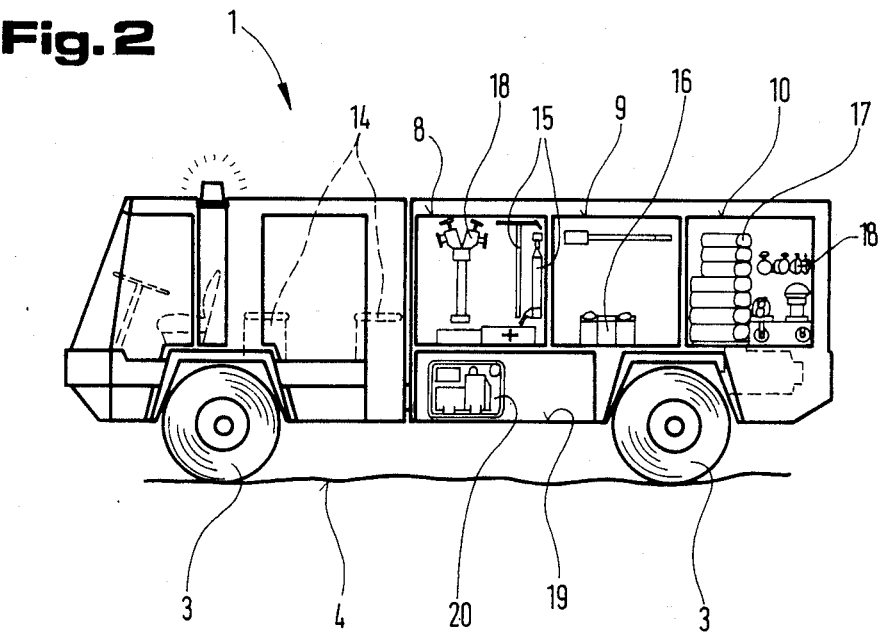
FIG. 2 is a plan view of the chassis frame of the vehicle of FIG. 1.

The service vehicle 2 of FIGS. 1 and 2, for example a fire service vehicle, comprises a chassis frame 1. The chassis frame 1 comprises a chassis frame structure 3 which is borne on a wheel support plane 7 or road surface via driving axles 4,5 and wheels 6 mounted on the axles 4,5. The chassis frame structure 3 extends from a region forward of the front driving axle 4, over the two driving axles 4,5 and into a region projecting rearwardly beyond the rear driving axle 5. A driving engine 8 is installed on the chassis frame structure 3 by means of securing means 9, at a location between the two driving axles 4,5. The securing means 9 are so fastened to the chassis frame structure 3, in such manner that a drive output 10 of the driving engine 8 is positioned above the axles 4,5 and between the driving axles 4,5 and upper extremities 12 of the wheels 6 oppositely situated to lower support points 11 of the wheels 6. The drive output 10 is also situated below top edges 13 of main bearers 14 forming the chassis frame 3. In the region of the rear driving axle 5, the main bearers 14 have a lower recess consisting of two angular deflections, followed by rearward frame members 17 of the main bearers 14 staggered towards and extending generally parallel to the wheel support plane 7. A fire extinguisher pump 18 is supported on the frame members 17 of the main bearers 14. Access to the fire extinguisher pump 18 or to another extinguishing fluid pump or to any assembly requiring manual access, for example a hose reel or the like and mounted on the frame member 17, is facilitated because the frame members 17 of the main bearers 14 are downwardly staggered in the direction of the wheel support plane 7.

The frame members situated at either side of the two angular deflections 15 and 16 subtend an angle 19 which is less than 180°.

The driving engine 8 is flange coupled directly to a transmission gearbox 20, which is transmissively coupled to axle drives 23,24 via power transmission means 21,22. The power transmission means 21,22 may be formed by UJ (universal joint) shafts, their dimensioning being so selected that each of the power transmission means 21,22 can transmit the total torque of the driving engine 8.

The transmission of power between the gearbox 20 and the axle drives 23,24 may alternatively be via hydraulic coupling, for example via hydraulic pumps, hydraulic pipes and hydraulic motors.

As also apparent from FIG. 1, the driving axles 4,5 are connected to the chassis frame 3 via leaf springs 25. The wheels of the front driving axle 4 are arranged to be steered by means of a steering wheel 26. As shown in FIG. 1 an implement carrier frame 29 is situated between a driver's cab 27 installed forwardly on the chassis frame 3 and a rearward equipment or implement cabin 28. An air filter 30, a compressed air tank 31, a spare wheel 32 and a fuel or lubricant tank 33, may for example be installed on the implement carrier frame 29. The space between the main bearers 14 of the chassis frame 3 is thereby kept free for the installation of the driving engine 8, of the transmission gear 20 and a power transmission means 34, e.g. a Cardan shaft for coupling a PTO (power takeoff) 35 to the fire extinguisher pump 18 for direct drive of the pump 18 from the driving engine 8.

As seen in FIG. 2 the driving engine 8 has its central longitudinal axis 36 laterally offset with respect to a central longitudinal axis 38 of the vehicle by a distance 37. The axes of output drives 39 for the driving axles 4,5 directed parallel to the longitudinal axis 38 of the vehicle are offset with respect to the longitudinal axis of the vehicle 38 by a distance 40 on the opposite side of the central longitudinal axis 36, and the power transmission means 21,22 are situated between the two main bearers 14 of the chassis frame 3.

As further seen in FIG. 2 the chassis frame 3 has two angular deflections 41,42 in the region behind the front driving axle 4, and in the plane extending parallel to the wheel support plane 7 producing an offset of the two main bearers 14, such that the spacing between the main bearers is increased rearwardly thereby in the region following the wheels 6 of the front driving axle 4 as compared to the spacing of the bearers extending between the wheels and over the front driving axle 4. The installation of the driving means as well as of the transmission is facilitated thereby. Each of the two angular deflections 41,42 has an angle 43 which is less than 180°. Drum brakes 44 are situated between the driving axles 4,5 and the wheels 6.

Figure 3:
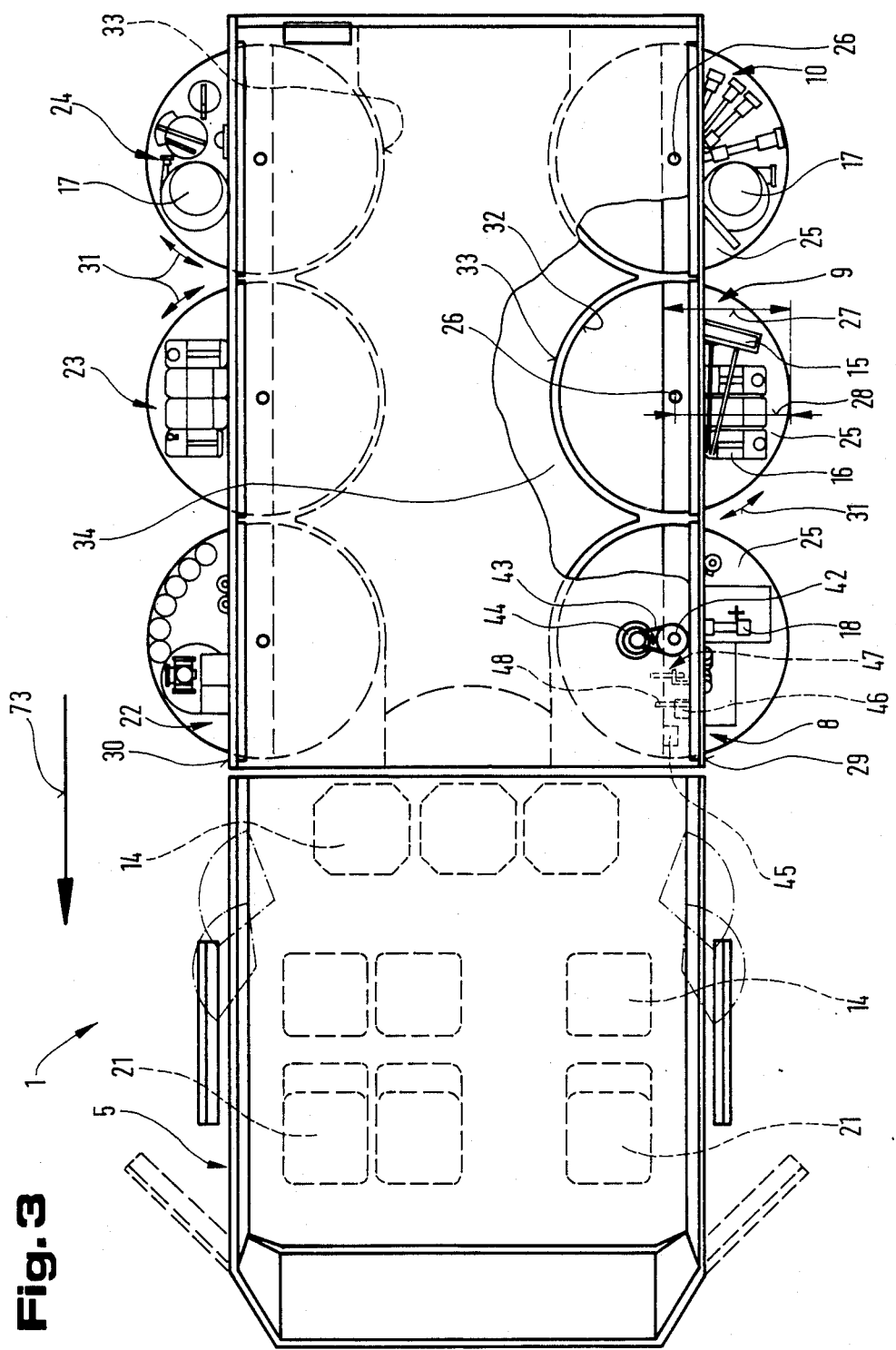
FIG. 3 is a side elevation of a service vehicle having a modified embodiment of a chassis frame.
Figure 4:
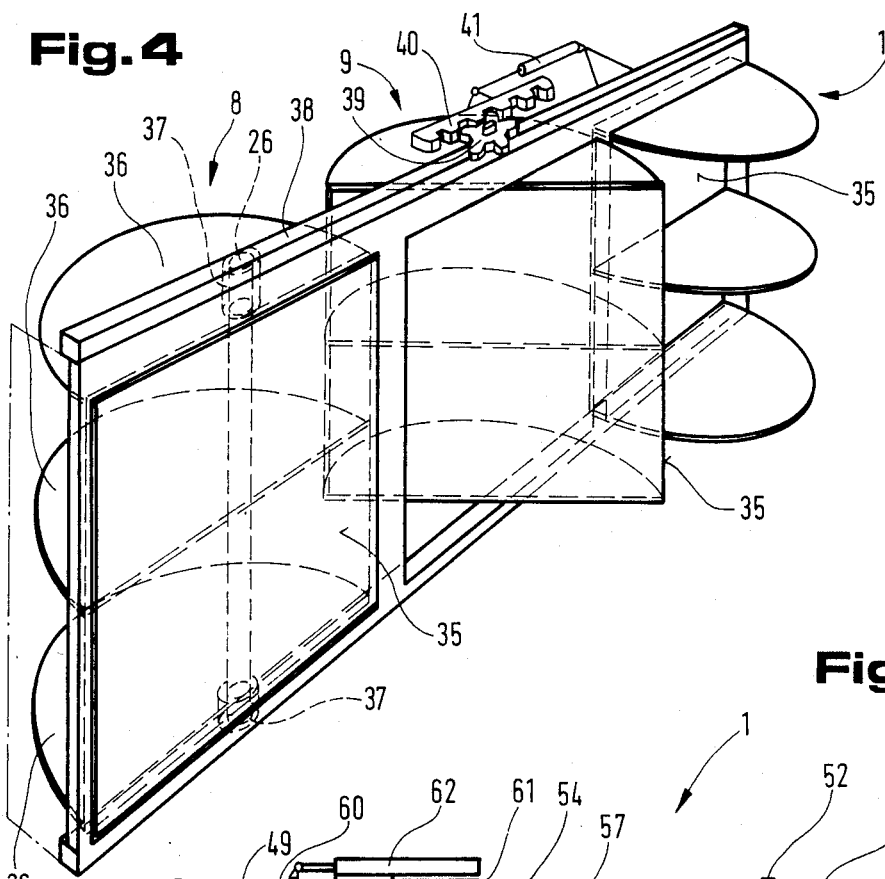
FIG. 4 is a plan view of the chassis frame of FIG. 3.

In the modified embodiment of chassis frame 45 for a service vehicle 2 as illustrated in FIGS. 3 and 4 and as apparent from FIG. 3 in particular, the chassis 45 comprises a chassis frame 46 of which a front frame section 47 extends in the region of the front wheels 6 facing away from the wheel support plane 7 and above the front driving axle 4. Another frame member 48 extending rearwardly beyond the rear driving axle 5 is upwardly displaced from the frame member 47 with respect to the wheel support plane 7 by approximately the height 49 of a superstructure of the vehicle. As apparent from FIG. 3 and FIG. 4, the frame members 48 extend within upper marginal areas of the superstructures of the service vehicle 2. The rear driving axle 5 is borne by the rear frame member 48 of the main bearer 51 forming part of the chassis frame 46 via a columnar bearer 50. The frame members 47 and 48 of the main bearers 51 are interconnected by frame members 52 extending obliquely downwardly and forwardly behind the front wheels 6, an angular transition 53 being provided in each case between the frame members 47 and 52, and 48 and 52, respectively. As apparent from FIG. 3 and 4, this is a spatial angular deflection in that the frame members also have angular offsets 53 not only in their plane extending parallel to the longitudinal axis 38 of the vehicle and vertically to the wheel support plane, but also have angular transitions 54,55 in the plane extending parallel to the wheel support plane 7. The main bearers 51 are thus spatially cranked and forward frame members 47 are both lowered and more closely spaced in relation to the frame members 48. Furthermore, the chassis frame 46 has a frame member 56 extending at the level of the frame members 47 but approximately along the longitudinal axis 38 of the vehicle, which extends centrally between the wheels of the front and rear driving axles 4 and 5. The frame member 56 accommodates the driving engine 8 .and a transmission 20 as well as—partially—an extinguishing agent tank 57 denoted by thin lines. The extinguishing agent tank 57 is installed in freely movable manner with respect to the chassis frame 46, via resilient securing elements 58, on the frame member 56 and on theframe members 48 of the main bearers 51. These securing elements 58 may be formed by rubber spring elements or leaf springs or analogous devices.

A driver's cab 27 is supported on the chassis frame 46 in the region of the forward frame members 47 and 52, whereas implement cabins or equipment modules 59 are suspended in simple manner on the frame members 48 of the main bearers 51 running through the upper marginal sections. Thanks to this suspension of the equipment modules 59, these are not fouled by frame members running through at the bottom and may be installed as close as possible above the wheel support plane 7 according to the ground clearance required. Access to the items of equipment and to the implements is considerably facilitated thereby. It is possible by uncomplicated technical means, for example as shown for a middle equipment module 59, by installing an intermediate frame 60 and a vertical displacement drive 61, e.g. a piston-cylinder system, for the equipment module 59 to be lowered at the site of operation to the lowered position illustrated by pecked lines, in guideways of the intermediate frame 60, or to set the same down altogether, so that the service vehicle may if appropriate be utilised to fetch other equipment modules. Instead of installing the vertical displacement drives 61 and the intermediate frames 60, the possibility is also available to displace the driving axle 5 along the columnar bearer 50 vertically with respect to the frame member 48 of the main bearers 51 by means of diagrammatically indicated vertical displacement drives 62 thereby reducing the access height to the equipment module 59 and to a fire extinguisher pump 18 possibly installed in the area of the frame member 56 projecting above the rear driving axle 5.

The spatial offset of the main bearers 51 allows for accommodation of the front driving axle 4 as well as an area of unconfined steering swing for the front wheels 6 and thus for an advantageous turning circle of the service vehicle. It is also possible to arrange for steering not only of the front wheels 6 but also of the rear wheels to secure more efficient cornering with economical tyre wear.

For the sake of clarity of illustration, claddings and the like are omitted from the illustration of FIG. 3, and the driver's cab 27 and some equipment modules 59 are omitted from FIG. 4, and the incorporation of the fire extinguisher pump 18 is indicated in a diagrammatical manner only. The connection between the chassis frame 46 and the cabins, modules or other superstructures commonly consists of resilient intermediate elements.

Furthermore, it is also possible in this form of the chassis frame 46 for the output drive 10 of the driving engine 8 to be installed without difficulty in a position vertically between the driving axles and the upper extremities of the wheels. The frame member 56 may to this end be downwardly or upwardly offset or cranked at right angles to the wheel support plane 7 with respect to the frame members 47.

Figure 5:
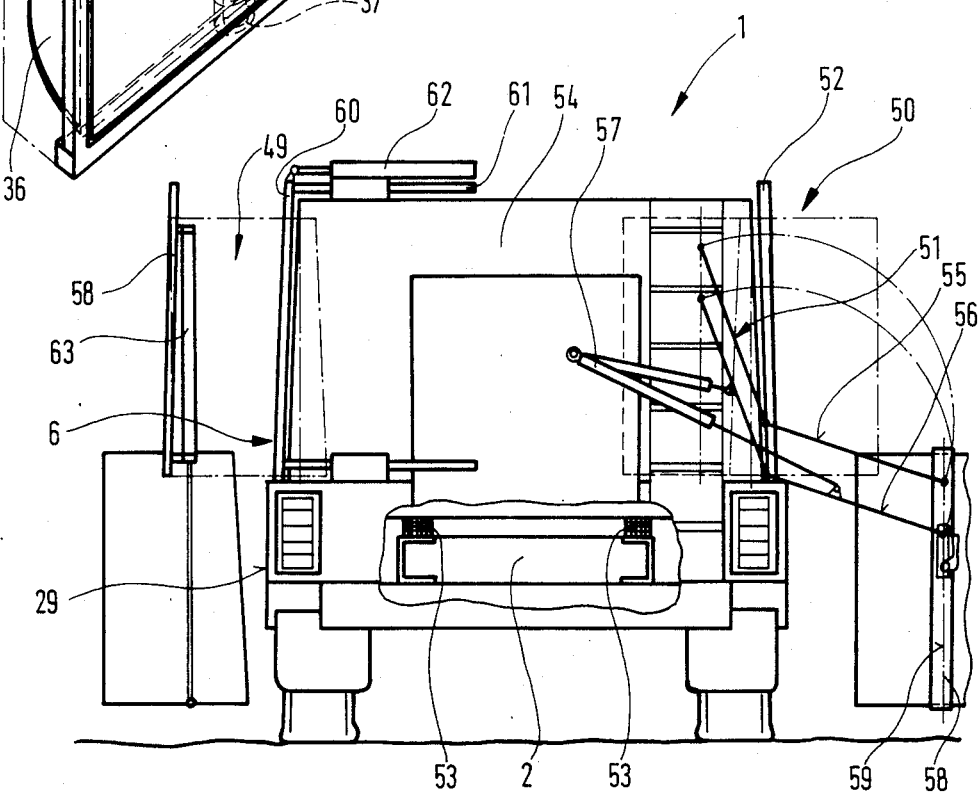
FIG. 5 is a side elevation of a service vehicle having another form of chassis frame comprising a framework overbridging the section between the two driving axles in the manner of a portal.
Figure 6:
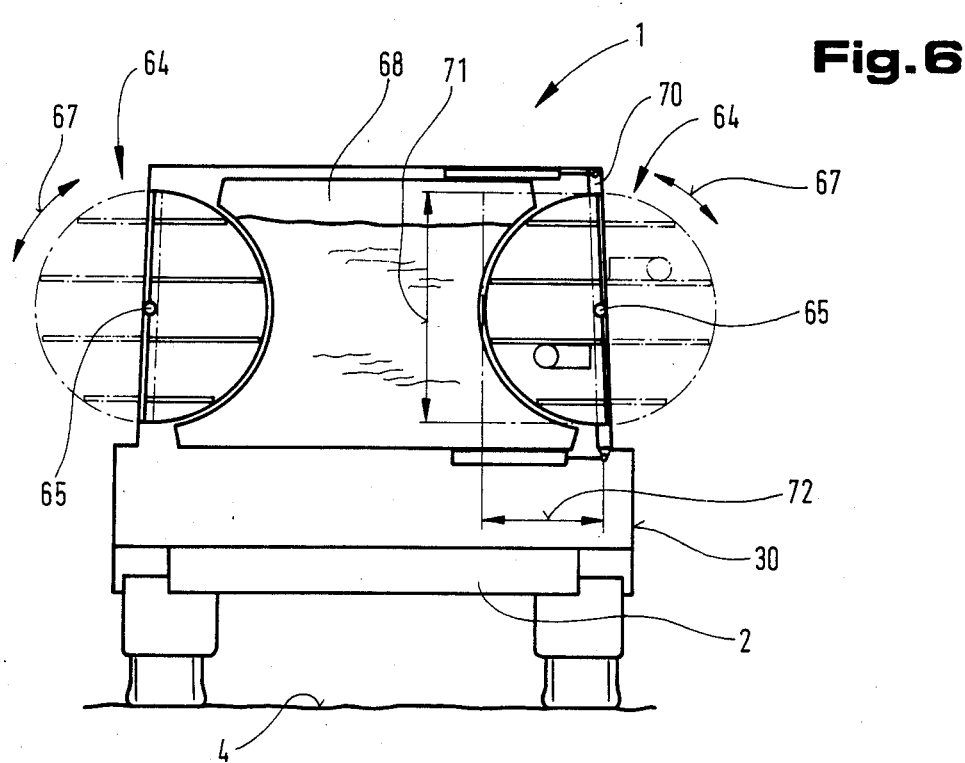
FIG. 6 is a plan view of the chassis frame of FIG. 5.

In the embodiment of FIGS. 5 and 6, a chassis frame 63 is provided with two main bearers 64 which overbridges the area between a front driving axle 4 and a rear driving axle 5 in the manner of a portal. To this end, the main bearers 64 are cranked substantially vertically downwardly and laterally inwardly in the opposed regions rearwardly of the front and forwardly of the rear axles 4 and 5, the main bearers 64 having two oppositely directed angular transitions 65,66 which jointly produce the cranked form. As a result the frame members 67,68 extend in the region of the front and rear driving axles 4 and 5, between the wheels 6 of these axles and immediately above the driving axles 4,5. This facilitates the fastening of the driving axles 4,5 and the assemblies required. In the section situated between the driving axles 4,5, the portal-like arrangement of the main bearers 64 enables equipment modules 59 to be suspended or hung from the chassis frame 63 to provide advantages of accessibility and lesser withdrawal heights.

In the chassis frame 63 of FIGS. 5 and 6, the driving engine 8 may advantageously be installed above the rear driving axle 5. It is unnecessary to install an additional supporting structure for the driving engine 8 since the engine may be supported directly on the frame members 68. At the same time, a fire extinguisher pump 18 or another extinguishing fluid pump or the like may be installed on the frame members 68 or on a frame member 69 forming a downwardly displaced extension thereof. A stowage space for instruments and devices for example for first-aid or salvage may be provided in the region above the driving axle 5. The extinguishing fluid tank 57 may be suspended in the same manner as the equipment modules 59, but centrally between these, between the two main bearers by means of transverse bearers. A driver's cab 27 is suitably installed in the section above the front driving axle 4.

Figure 7:
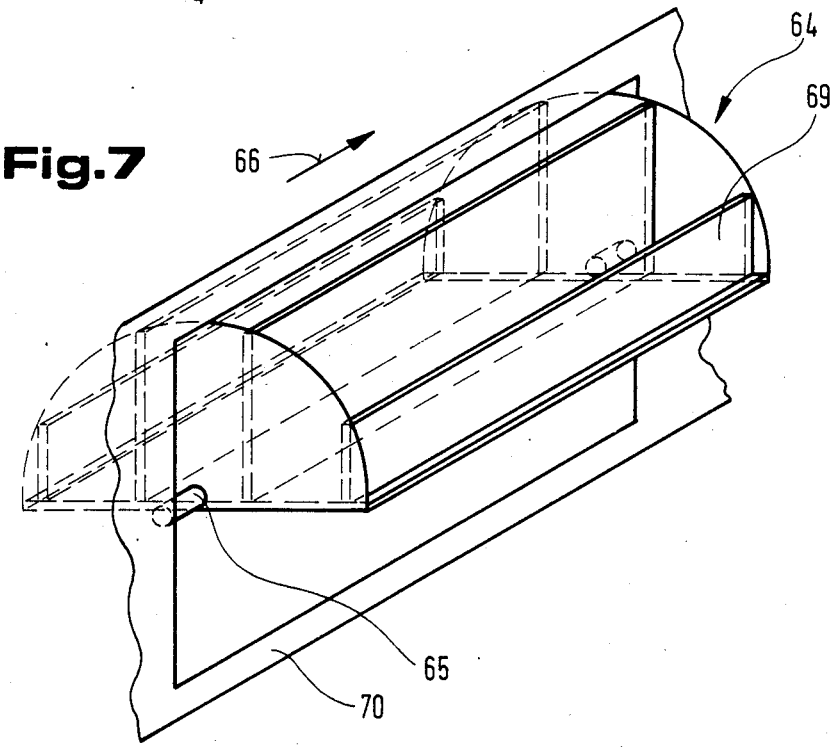
FIG. 7 is a side elevation of a service vehicle with another embodiment of a chassis frame having frame structure elements staggered in the direction of the support plane.

In the embodiment of FIG. 7 a chassis frame 70 is cranked in the direction of the wheel support plane 7 between the front and rear wheels 6. Frame members 71 of the two main bearers 72 extending mutually parallel, are lowered downwardly in the direction of the wheel support plane between the front driving axle 4 and the rear driving axle 5, for which purpose the main bearers 72 are formed with two angular transitions or a cranked section in the region of the two driving axles and their wheels which are turned towards each other to extend between the pairs of wheels and over the axles. The driving engine 8 as well as a fire extinguisher pump 18 are secured to the main bearers 72 via simple fastening devices, and the equipment modules or the driver's cab 27 or other superstructures, such, for example, as turntable ladders, elevating platforms or the like may be installed directly on the main bearers of the chassis frame 70. A reduced overall height of a service or fire service vehicle 2 is obtainable by displacement of the frame member 71 in the direction of the wheel support plane 7.

As also shown in FIG. 7 pressure fluid spring elements 73, for example pneumatic springing elements, may be arranged between the driving axles 4,5 and the chassis frame 70. These pressure fluid spring elements 73 being connected to a pressure fluid supply system 74 via a bleed and filling valve 75. For actuation of the bleed and filling valves 75, actuating members 76 are provided, for example in the driver's cab 27 or at different points of the superstructure, for example in the area of the fire extinguisher pump 18 or in the area of equipment modules.

It is thereby possible by utilising the pressure fluid spring elements 73 to reduce the already very low height of the service vehicle by lowering the chassis frame 70 closer to the wheel support plane 7.

In all of the embodiments of FIGS. 1 to 7, the form of the chassis frame allows mounting of the driving engine 8 at an appropriate position with respect to the chassis frame with the drive 10 located above the axles and between the driving axles and the upper extremities of the wheels 6, as illustrated diagrammatically in the drawings. The construction and form of the implement cabins or equipment modules is freely selectible. The equipment modules or implement cabins may be constructed from sectional tubing with external claddings, pivot or sliding doors or roller blinds.

Furthermore, as indicated in FIG. 4 the service vehicles 2 or fire service vehicles according to the invention, may also be equipped with impact or collision guards 77. A trailer coupling 78 may be situated on the impact guard 77. So that access to intake couplings or the like is not obstructed, for example if the fire extinguisher pump 18 is installed as deeply as rendered possible by the construction of the chassis frame according to the invention, the impact guard 77 may be arranged to be pivoted around an axis at right angles to the wheel support plane 7 as shown by pecked lines, together with the trailer coupling 78, upon reaching a site of operation. Instead of a structure of this kind, the bearer forming the impact guard may however be arranged to be removed completely by withdrawing locking bolts, or pivoted around other axes, such as by parallelogram lever systems or the like.

Figure 8:
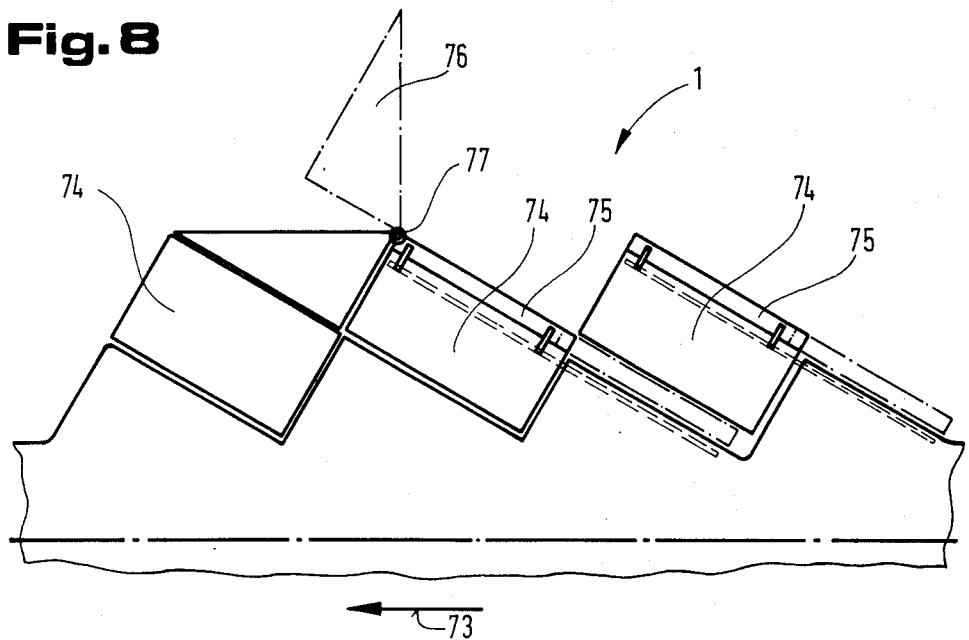
FIG. 8 is a side elevation of a service vehicle with parts removed to expose a drive system according to the invention.

A service vehicle 101, comprising a chassis frame 102, a driver's cab 103 and an utility superstructure 104, which may also contain an extinguishing fluid tank 105, is illustrated in FIG. 8.

The driver's cab 103 and the utility superstructure 104 are shown by thin outlines only and cut away so that the propulsion system according to the invention for a service vehicle of this kind may be illustrated more clearly.

Figure 9:
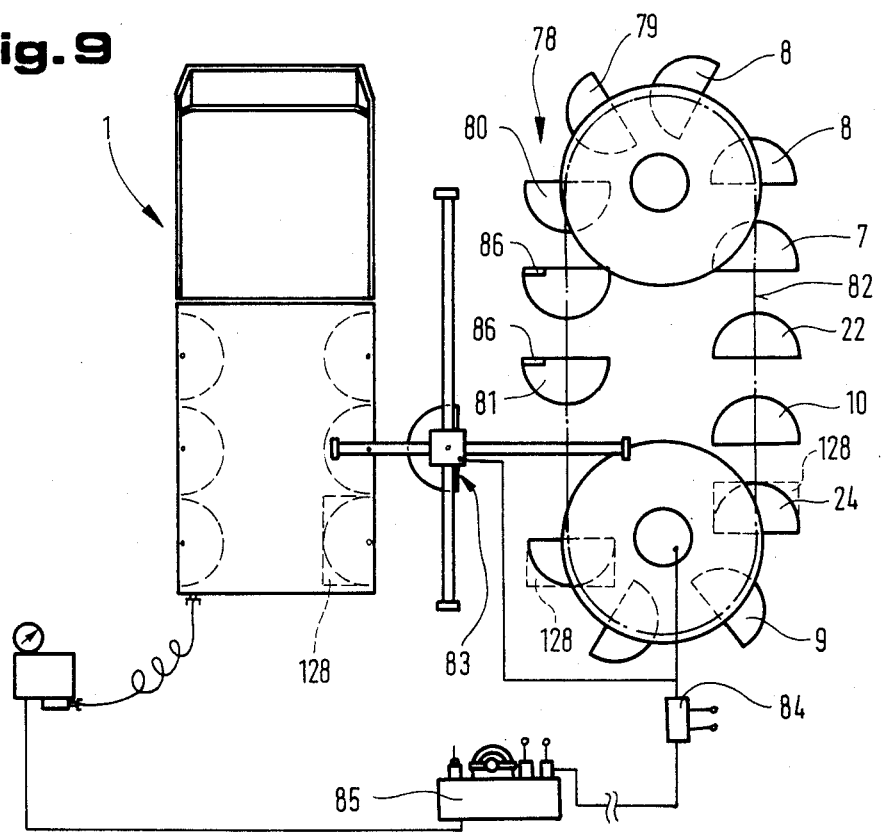
FIG. 9 is a plan view of the service vehicle according to FIG. 8.

As apparent from FIGS. 8 and 9, the vehicle frame 102 comprises two main bearers 106,107 extending parallel to each other in the longitudinal direction of the vehicle. The main bearers 106,107 of the vehicle frame 102 are supported via conventional springing means, for example leaf springs or compressed air springs, on a steerable driving front axle 108 and a rear driving axle 109. The two driving axles 108,109 carry wheels 110 with single tires. The vehicle frame 102 houses an auxiliary unit 112 formed by an extinguishing fluid pump 113 in the region 111 projecting forwardly beyond the front driving axle 108 and between the two main bearers 106,107. The extinguishing fluid pump 113 is transmissively coupled via a Cardan shaft 114 acting as a driving connection to the transmission module 115 similarly situated between the main bearers 106,107. The Cardan shaft 114 is then coupled to a PTO (power takeoff) 116 of a shift-gear transmission 117. The transmission module 115 has a converter gear 118 apart from the shift-gear transmission 117 and intermediate inter-axle gearbox 119, housed in the same casing. The transmission module 115 is borne on a transverse bearer 121 secured on the two main bearers 106,107 via oscillation-damper elements 120.

As more clearly apparent from FIG. 8, output drives 122,123 of the inter-axle gearbox 119 are coupled via Cardan shafts 124,125 to axle drives 126,127. An all-wheel drive vehicle is obtained thanks to this construction, in which the two driving axles 108 and 109 may be driven independently of each other. The rating of the Cardan shafts 124,125 as well as of the intermediate inter-axle gearbox 119 and of the axle drives 126,127 is so selected that the total torque available for propulsion of the service vehicle 101 may be transmitted via either of the two Cardan shafts 124 or 125. The service vehicle 101 may be operated at will with front-wheel drive, rear-wheel drive or all-wheel drive.

An input shaft 128 of the transmission module 115 is coupled to a driving engine 130 via another Cardan shaft 129.

The driving engine 130 is installed on the main bearers 106,107 in an area 131 of the vehicle frame 102 projecting rearwardly beyond the rear driving axle 109. An output drive 132 of the driving engine 130 is situated at the level of an upper margin 133 of the vehicle frame 102.

Thanks to the construction of the propulsion system and the arrangement of the individual assemblies, the vehicle frame 102 has an approximately identical load distribution in the areas 111,131 projecting beyond the two driving axles 108,109. Thanks to the spacing between the two main bearers 106,107, the driving engine 130, the transmission module 115 and the auxiliary assembly 112 may be installed at a small distance from the wheel support plane 134. Space for superstructures and cabin sections is provided between the two driving axles 108,109, above the top edge 133 of the main bearers 106,107, as well as sidewardly thereof. An extinguishing fluid tank 105 may thus advantageously be installed in the area between the two driving axles 108,109. The weight of the transmission module 115 and of the extinguishing fluid tank 105 is then divided approximately evenly between the two driving axles 108,109, thereby securing a neutral driving behaviour of the service vehicle 101.

It is also possible, for the driving engine 130 to be installed for example right at the transmission module 115 or between the transmission module 115 and the rear driving axle 109, and to install the extinguishing fluid tank 105 in the rear section of the service vehicle 101.

An installation of this kind of the driving engine is denoted by pecked lines in FIG. 8.

Figure 10:
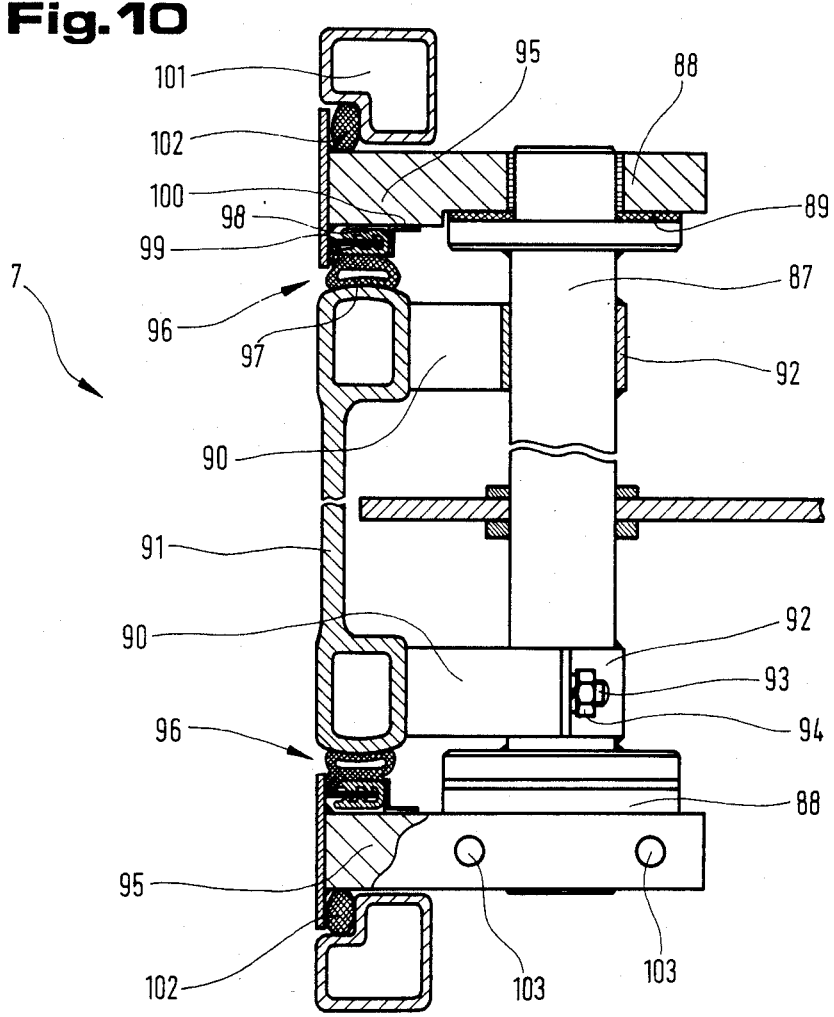
FIG. 10 is a fragmentary section taken on line X—X of FIG. 9 of the arrangement of an auxiliary assembly on the chassis frame structure.

The mounting of the auxiliary assembly 112, comprising an extinguishing fluid pump 113, is shown, for example, in FIG. 10. The extinguishing fluid pump is borne on an intermediate frame 136 via oscillation-damper elements 135, and the intermediate frame is located in the inner side of the main bearers 106,107 over rollers 137. The intermediate frame 136 may be secured to the main bearers 106,107 at the corresponding extreme positions by means of locking bolts 138.

After pivoting a panel 139 in the front of the driver's cab 103 as denoted by an arrow 140, it is thus possible to place the auxiliary assembly 112 comprising the extinguishing fluid pump 113 in the space present forwardly beyond the front 141 of the vehicle.

If the extinguishing fluid pump is mounted on an intermediate frame 136 of this kind and not fixedly on the vehicle frame 102, the Cardan shaft 114 is constructed as a telescopic shaft as diagrammatically denoted in FIG. 9, to allow for the auxiliary assembly 112 being pushed outside and inside of the vehicle without interruption of the transmission line.

Instead of the extinguishing fluid pump shown in FIGS. 8 to 10, it is also possible to install any other and optional auxiliary assembly, for example a current generator, a hydraulic system or the like.

It is also possible to provide any other kind of mounting for the auxiliary assembly instead of the intermediate frame 136 movable by means of rollers, for example a parallelogram linkage of levers which is secured on the main bearers 106,107 of the vehicle frame 102.

Figure 11:
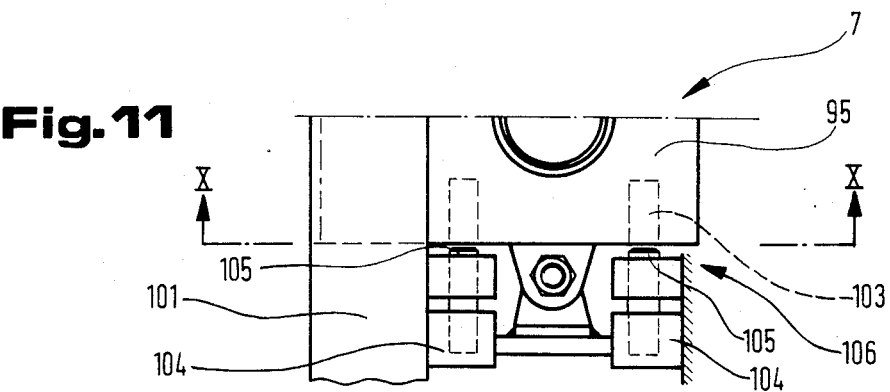
FIG. 11 is a fragmentary section taken on the line XI—XI of FIG. 9 of a transmission module.

FIG. 11 shows the mounting of the transmission module 115 between the two main bearers 106 and 107 of the vehicle frame 102. As apparent, the transverse bearer 121 is of U-shaped form and has its two free extremities connected via the oscillation damper elements 120 to the main bearers 106,107 of the vehicle frame 102.

This allows the transmission module 115 to move under resilient damping in several spatial directions with respect to the vehicle frame 102.

Figure 12:
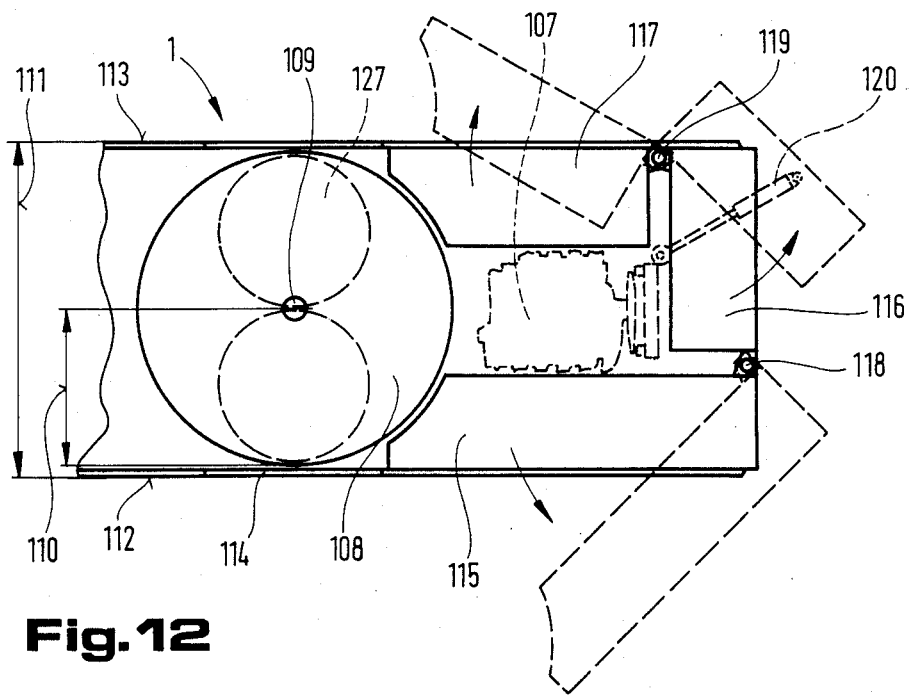
FIG. 12 is a fragmentary section taken on line XII—XII of FIG. 9 showing the arrangment of the driving engine with respect to the chassis frame structure.

It is shown in FIG. 12 that the driving engine is borne via engine bearers 142 and vibration damper elements 120, equally on the two main bearers 106,107 of the vehicle frame 102. The engine bearers 142 are so constructed that the output drive 132 of the driving engine 130 is positioned approximately in the area of the upper margins 133 of the main bearers 106,107 or of the intermediate frame placed thereon.

Figure 13:
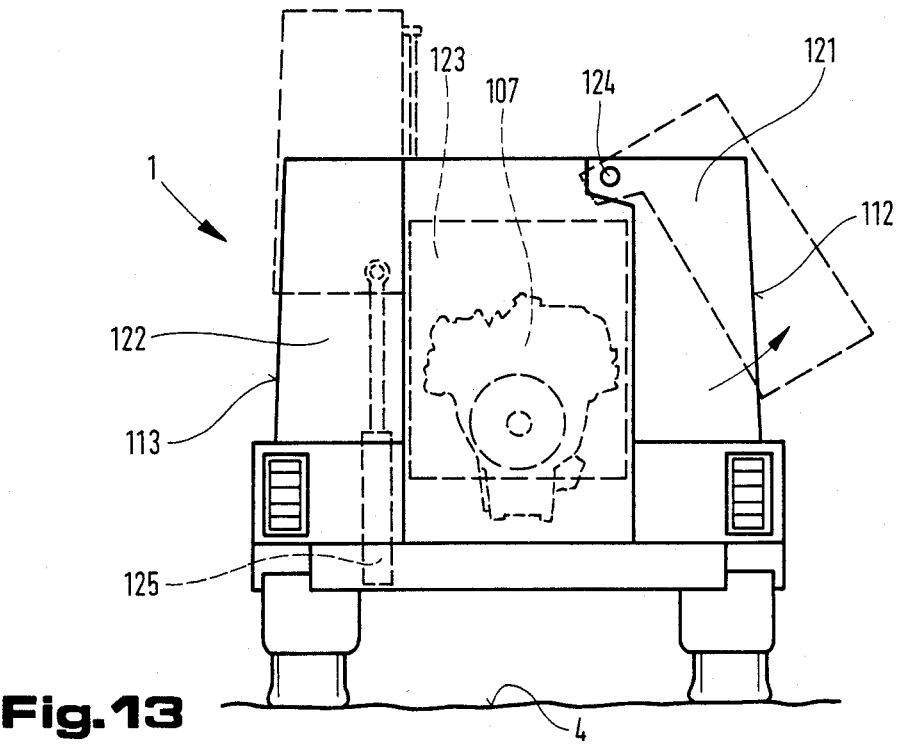
FIG. 13 shows a drive layout of a drive system for a service vehicle according to the invention.
Figure 1:
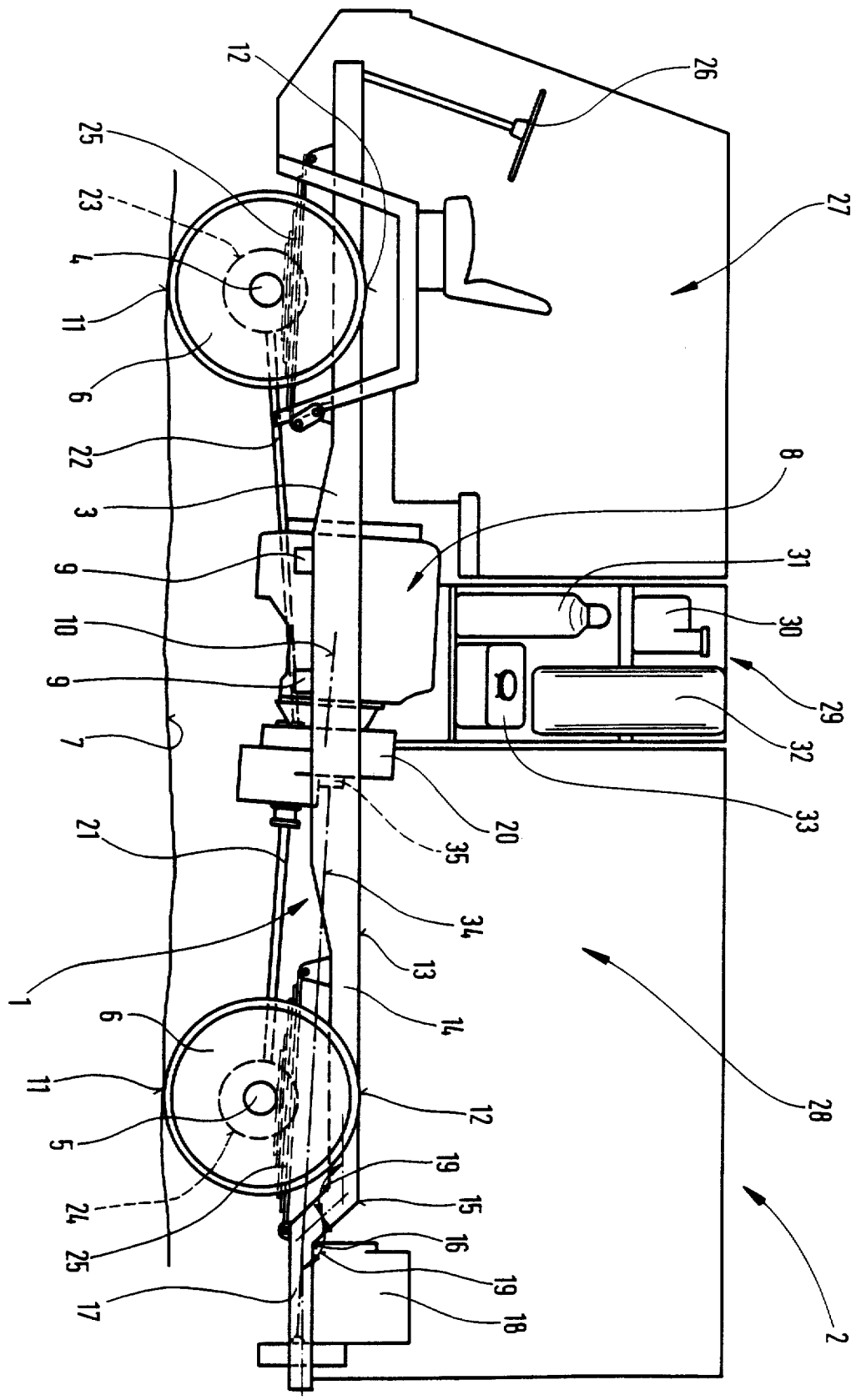
Figure 2:
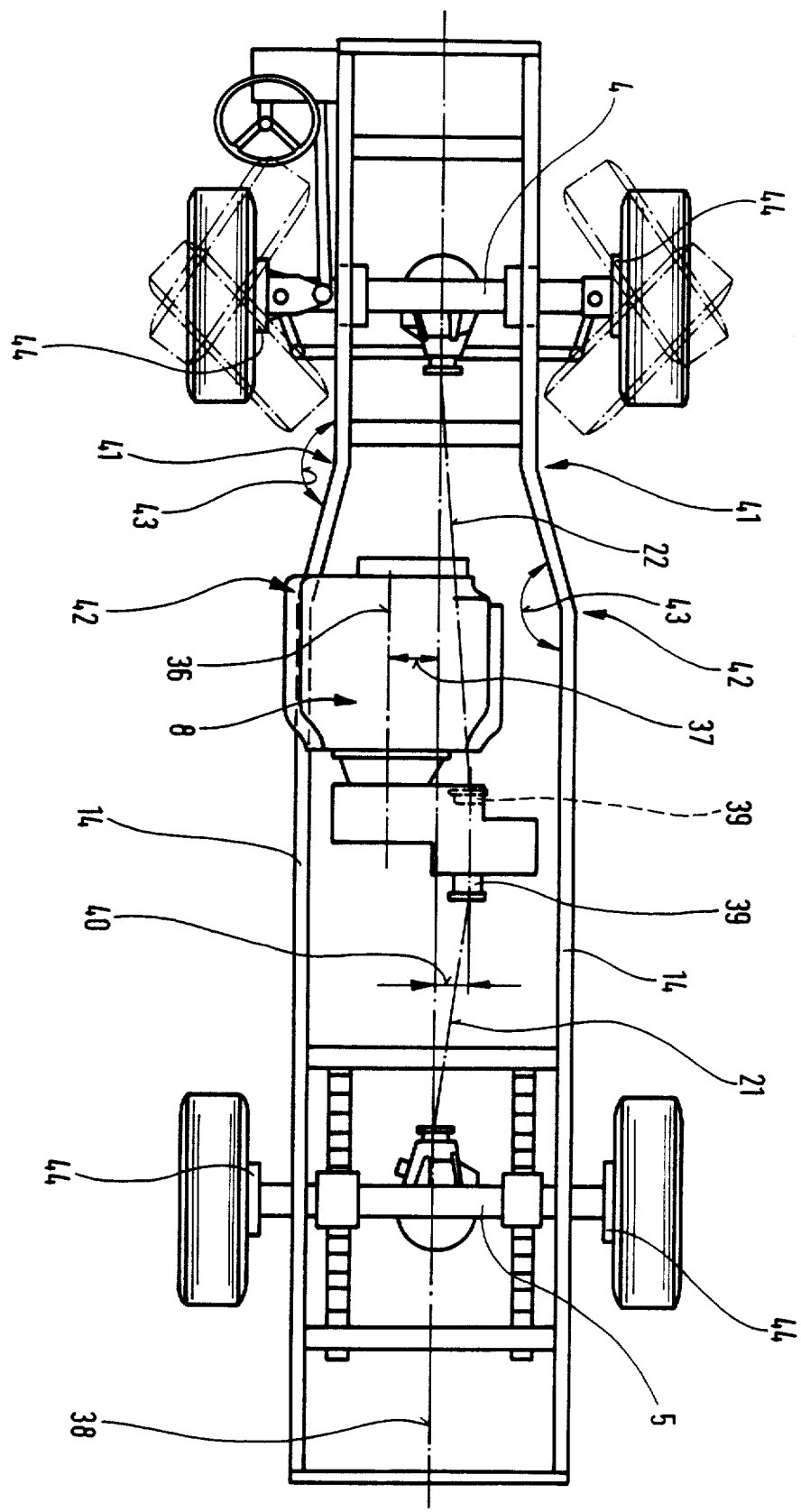
Figure 8:
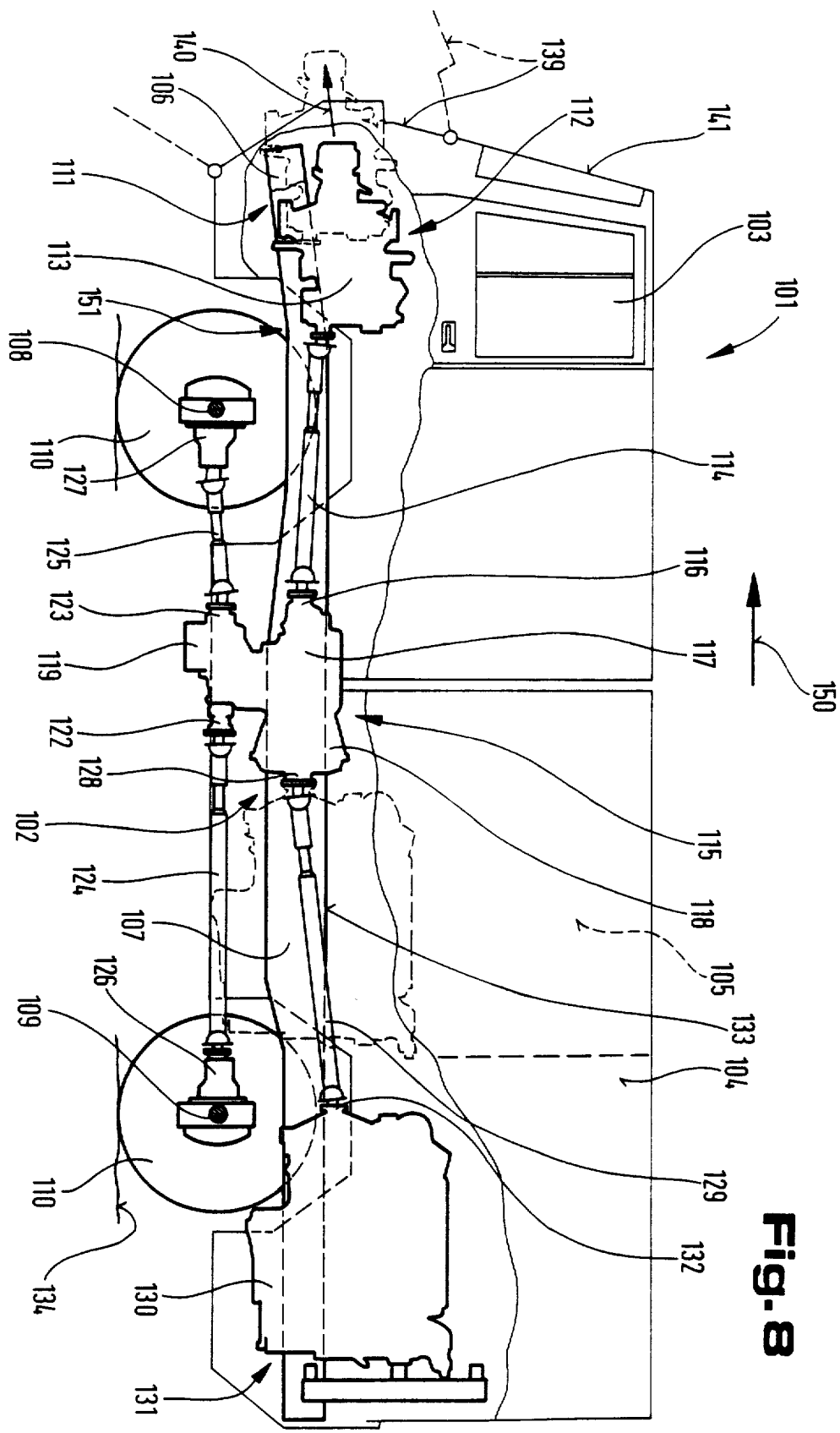
Figure 13:
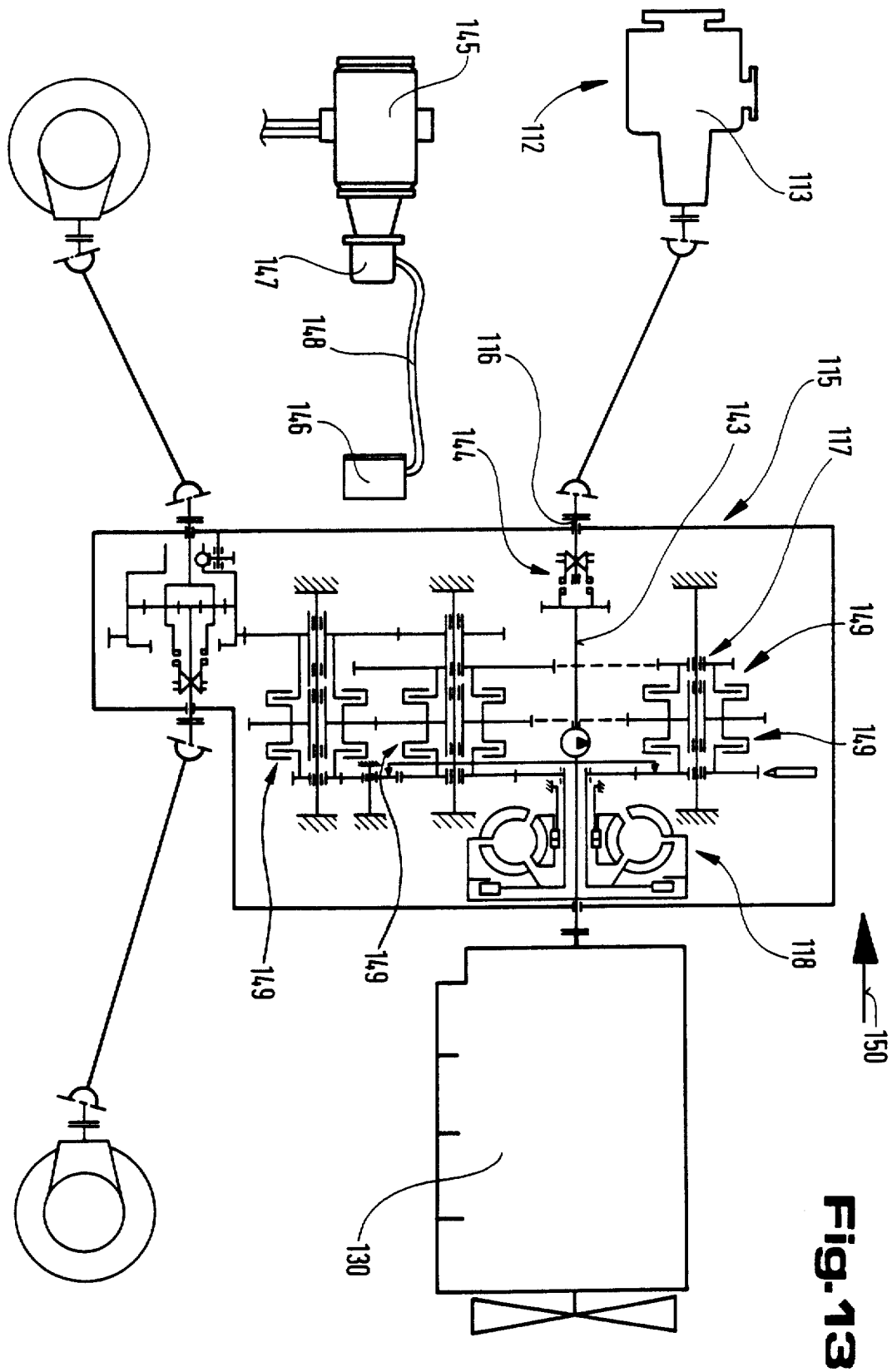

FIG. 13 shows a possible modified embodiment of a drive layout, in which the drive engine 130 is flange-coupled direct to the transmission module 115 incorporating the converter gear 118 and the shift-gear transmission 117 as is more clearly apparent from this illustration. A main gearshaft 143 is coupled to the PTO (power takeoff) 116 via an electromagnetically operated clutch 144 whereby a power consumer, for example the extinguisher fluid pump 113 or another auxiliary assembly 112, for example a generator 145, acted upon via the PTO 116, may thereby be coupled or decoupled under load.

As shown diagrammatically, it is possible to flange-couple a hydraulic pump 146 to the PTO 116 and to connect the same by means of flexible pressure pipes 148 with a hydraulic motor 147 flange-coupled to the input shaft of the generator 145 to form a hydraulic driving unit. External light sources or other working implements or the like may be operated by the generator 145.

The converter gear 118 comprises a pump impeller, a turbine wheel and an interposed idler wheel. At a high turbine r.p.m., say 80% of the pump r.p.m., the turbine torque approximates the pump torque. The converter bypass coupling is closed automatically at this time. The converter gear 118 is provided with a braking freewheel, which serves the purpose of coupling the drive and turbine shafts in force-locked manner whilst the vehicle is on the overrun, so that the braking action of the engine may be exploited. The multi-gear converter gear produced in the manner of an attachment comprises a multiplate clutch 149 which is hydraulically operated and shiftable under load. All the wheels are in constant drive engagement. The transmission control system is devised as an electrohydraulic circuit, which may be embodied as a preselector circuit, i.e. the separate gears are preselected as required on the drive selector, or as an automatic circuit, i.e. the ratios required are selected automatically as a function of the momentary mode of operation. The supply of oil to the converter and to the circuit is provided by means of a gear pump which is installed on the drive shaft or main gearshaft 143 driven by the engine in the transmission module.

Within the scope of the invention, it is possible to utilise any other transmission instead of the transmission layout described, and for example to apply mechanically shifted transmissions with mechanical clutches or the like. The clutch 144 for the PTO 116 is not restricted to the form of embodiment depicted in FIG. 13.

The form of the main bearers 106,107 of the vehicle frame 102 is also freely selectible within the ambit of the invention. Instead of one-piece continuous main bearers, it is thus also possible to utilise multisectional main bearers which may for example in the regions of the angular offset or else in other intermediate portions of their longitudinal extent be joined together by means of bolted joints.

The propulsion system according to the invention may advantageously be utilised not only for fire service vehicles but for any other category of service vehicles, for example such as elevator vehicles, public utility vehicles or the like.

The direction of travel of the vehicle is throughout denoted by an arrow 144 in the drawings.

As apparent from FIGS. 8 and 9, the two main bearers 106 and 107 extend mutually parallel throughout the vehicle length and have an angular offset 151 only in a plane extending at right angles to the wheel support plane 134. The section 111 of the chassis frame 102 following the angular offset 151 and projecting even farther forward from the front driving axle 108 is inclined in the direction of the wheel support plane 134. This facilitates the incorporation of an auxiliary assembly 112, being an extinguishing fluid pump 113 in the present case. Thanks to the inclined extension of the section 111 of the vehicle frame 102, and as also apparent from FIGS. 9 and 10, the withdrawal of the auxiliary assembly 112 beyond the front end side of the service vehicle 101 is possible in an uncomplicated manner.

Another advantage of the form of the main bearers 106 and 107 passing without any angular deflection throughout a plane extending parallel to the wheel support plane consists in that the front driving axle 108 as well as—if desirable—the rear driving axle 109 may be constructed to be steerable, thereby complementarily facilitating manoeuvering operations with the service vehicle 101.

Whilst the invention and many of its attendant advantages will be understood from the foregoing, it will be apparent that various changes may be made in the form, construction and arrangement of the parts described without departing from the spirit and scope of the invention or sacrificing all of its material advantages.

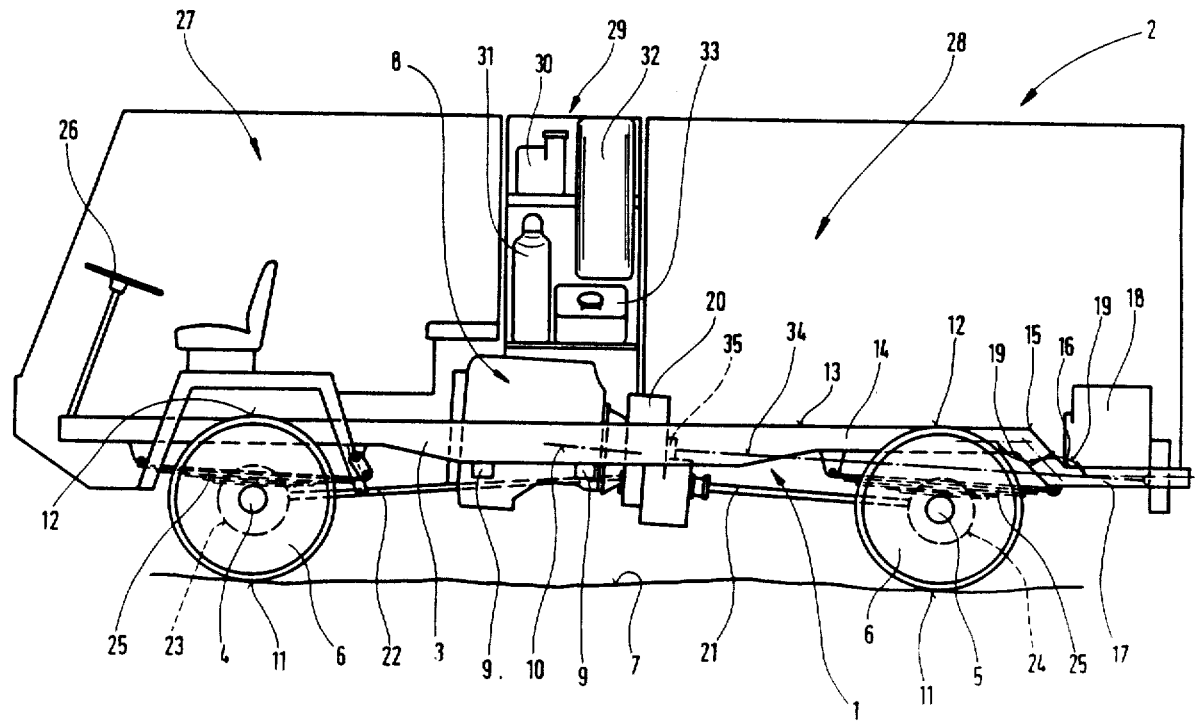

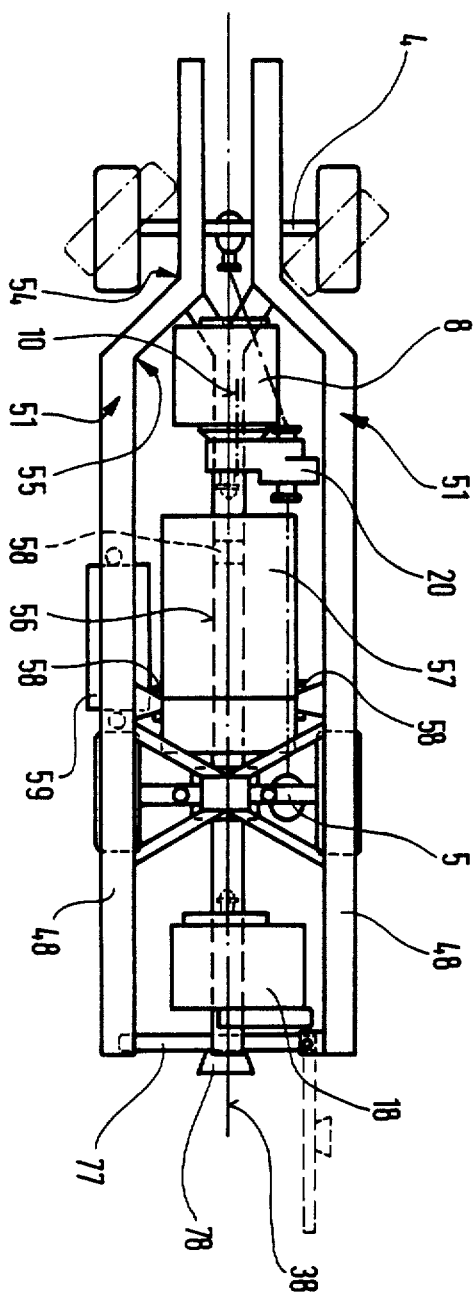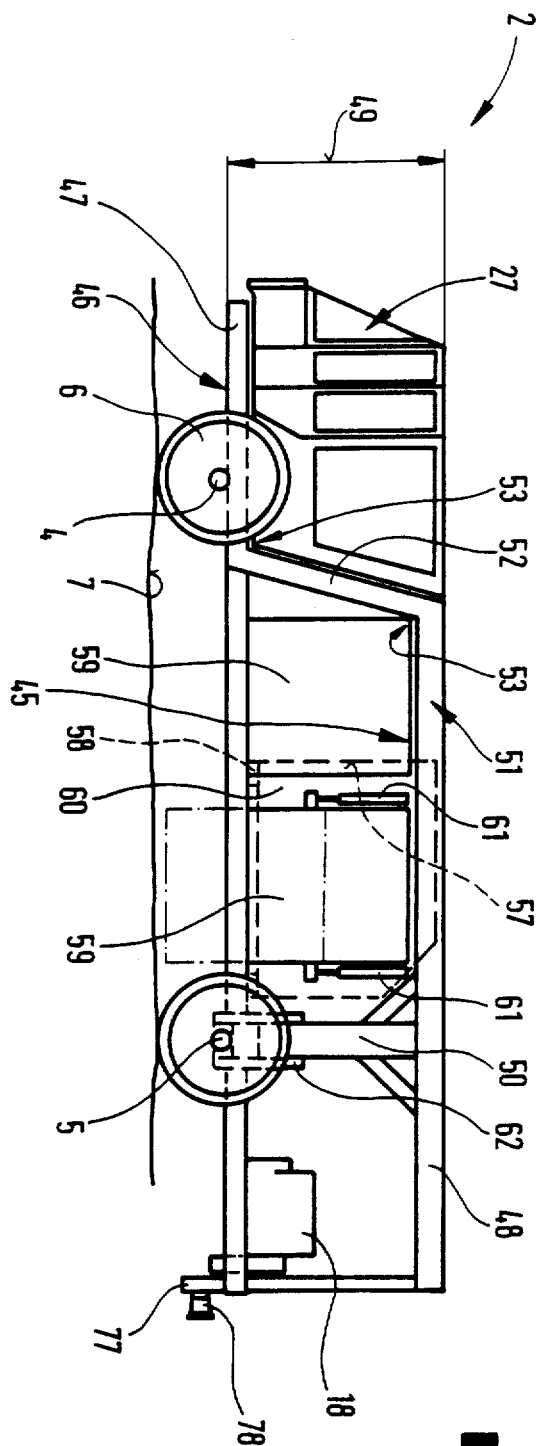

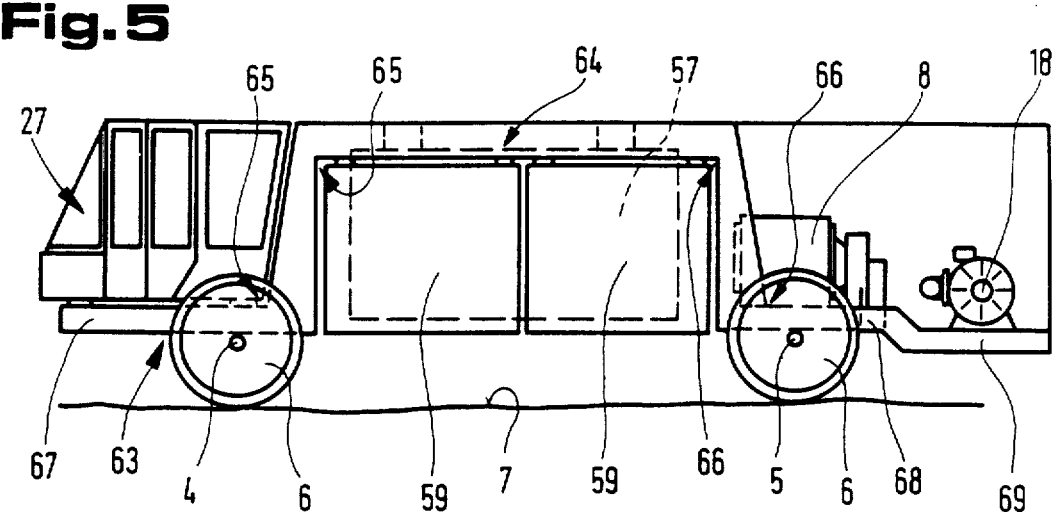
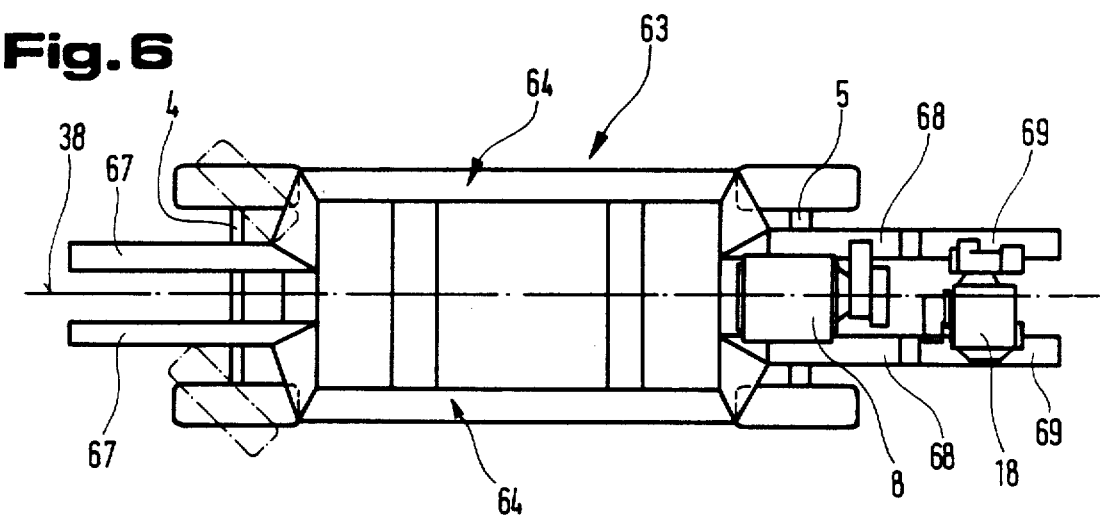
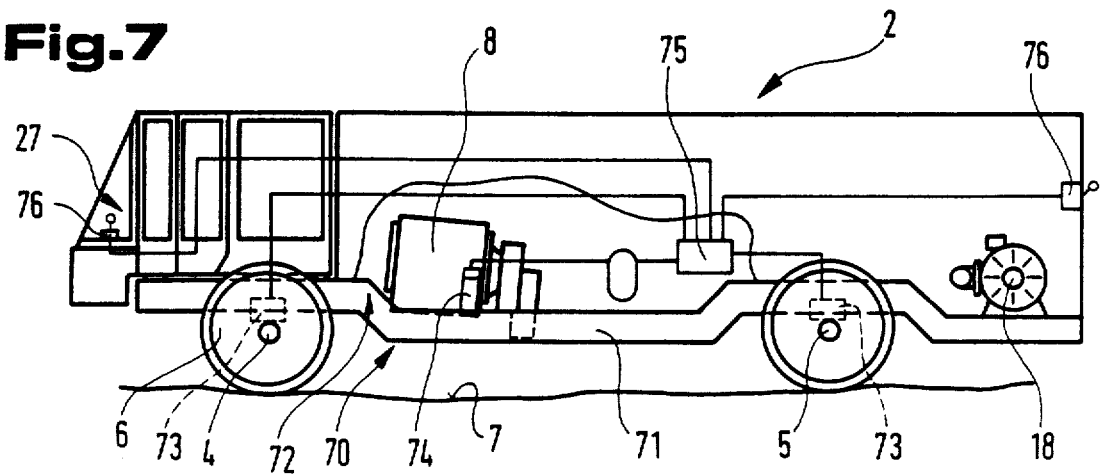

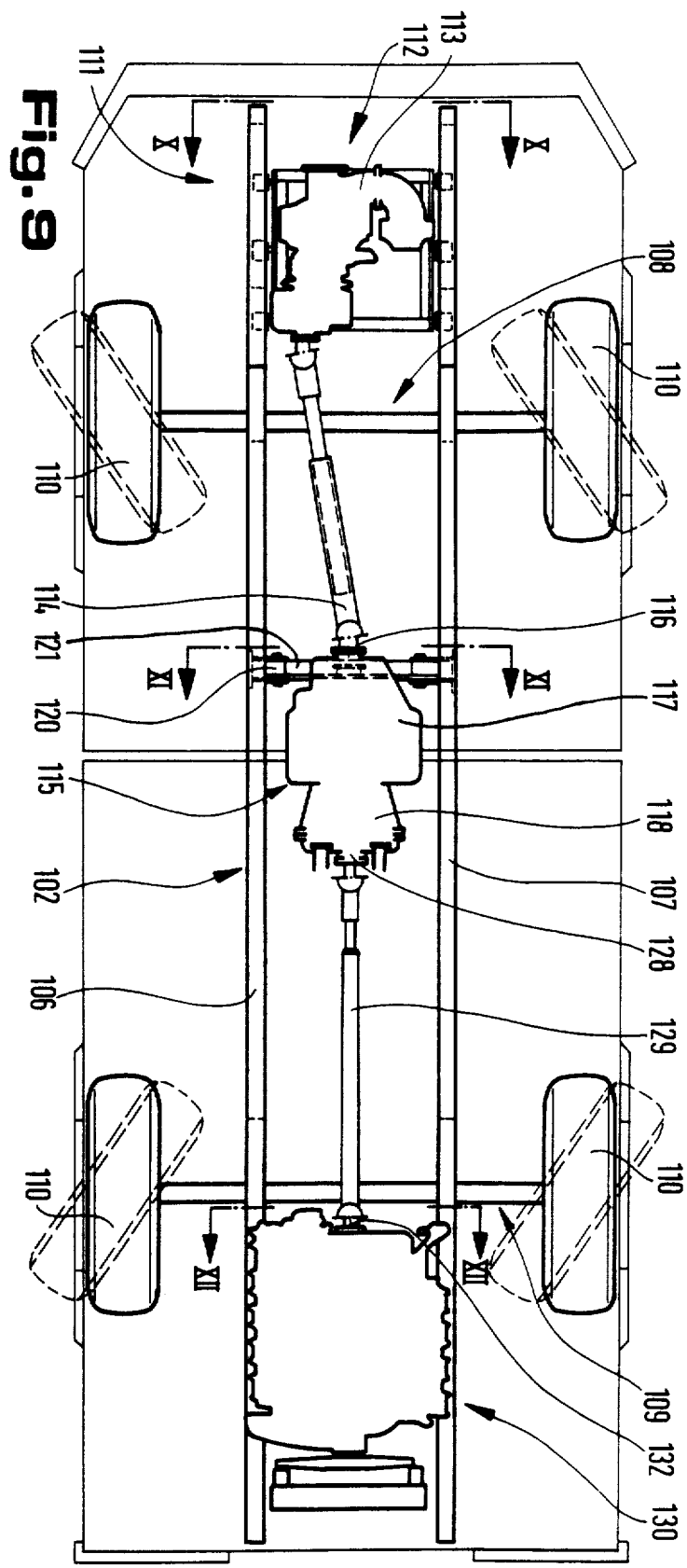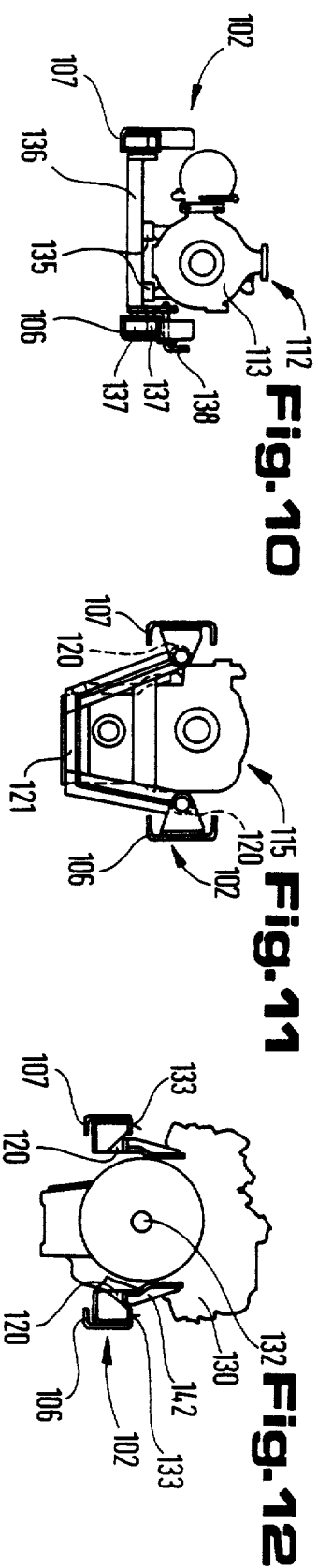

We claim:

1. A service vehicle comprising an uninterrupted vehicle framework having a main bearer extending in a longitudinal direction of the vehicle, the main bearer having an angled portion, a driver's cab, a front driving axle and a rear driving axle carrying wheels and supporting the vehicle framework, the driving axles being spaced apart in the longitudinal direction to define a longitudinally extending space therebetween, a driving engine situated on the vehicle framework between a stern of the vehicle and said longitudinally extending space, a transmission between the driving engine and the driving axles, and an auxiliary unit mounted on the vehicle frame work frontwards of the front driving axle.

2. A service vehicle according to claim 1, in which the auxiliary unit is installed over the front driving axle and forwardly of an angled portion.

3. A service vehicle according to claim 2, in which the framework has plurality of said main bearers extending in the longitudinal direction of the vehicle and spaced apart transversely to the direction of travel, and the angled portions having sections extending forwardly from the angled portions, the angled portions extending downwardly at an angle towards a wheel support plane.

4. A service vehicle according to claim 3, in which the main bearers are arranged in a plane substantially parallel to the wheel support plane and the sections extending forwardly of the angled portions have a smaller transverse spacing than sections of the main bearers rearwardly of the angled portions.

5. A service vehicle according to claim 1, in which the framework has a plurality of said main bearers extending longitudinally and spaced transversely of the vehicle, the main bearers being formed with respective ones of said angled portions disposed, between the front and rear axles and extending transversely of a longitudinal direction of the main bearers.

6. A service vehicle according to claim 5, in which the angled portions extend lengthwise, widthwise and heightwise in relation to the vehicle.

7. A service vehicle according to claim 5, in which the main bearers overbridge a section between the front driving axle and the rear driving axle in the manner of a portal.

8. A service vehicle according to claim 1, in which the frame work has members at either side of the angled portions subtending an angle smaller than 180° facing towards the wheels.

9. A service vehicle according to claim 1, further comprising mounting means for the driving engine situated rearwardly of the front axle and an output shaft of the driving engine positioned above the driving axles and between the driving axles and upper portions of the wheels.

10. A service vehicle as claimed in claim 9, in which the mounting means for the driving engine is situated between the front and rear axles.

11. A service vehicle according to claim 9, in which the mounting means for the driving engine is installed rearwardly of the angled portion, and further comprising a gearbox having an output shaft, the output shafts being transversely spaced apart from, and on opposite sides of, a longitudinal axis of the vehicle by approximately the same amount.

12. A service vehicle according to claim 1, in which the framework has a plurality of said main bearers projecting in the direction of travel over the front driving axle, and further comprising fastenings for the auxiliary unit on projecting sections of the main bearers, the main bearers having sections projecting rearwardly over the rear driving axle and supporting the driving engine.

13. A service vehicle according to claim 1, further comprising a gearbox and an intermediate gearbox forming a compact transmission module, the transmission module having two output drives extending in the longitudinal direction of the vehicle in opposite directions and a power take-off pointing in the direction of the front driving axle, the transmission module being installed on the framework between the two driving axles.

14. A service vehicle according to claim 13, in which the transmission module comprises a shift-gear transmission, a converter transmission, and an inter-axle gearbox integrated therein and having a differential lock, the power take-off being arranged approximately in rectilinear extension of a transmission input shaft coupled to the driving engine, the drives being situated in a plane displaced in the direction of the wheel support plane, and an electromagnetic clutch installed between the main gearshaft and the power takeoff.

15. A service vehicle according to claim 13, in which the transmission module, the auxiliary unit and the driving engine are situated between two of said main bearers of the framework which are spaced apart from each other transversely to the longitudinal direction of the vehicle.

16. A service vehicle according to claim 1, in which the auxiliary unit is displaceably mounted for displacement with respect to the main bearer in an intermediate frame located on the main bearers, and is arranged for displacement from a stowed position within the external delimitation of the vehicle, into an operational position extending at least partially beyond the external vehicle configuration.

17. A service vehicle according to claim 1, further comprising a transmission output drive for the front and rear driving axles, associated power transmission devices and inter-axle transmissions, each constructed for transmission of the total torque of the transmission output of the engine.

18. A service vehicle according to claim 1, in which the front and rear driving axles each have two wheels and are suspended on the chassis frame by means of leaf springs.

19. A service vehicle according to claim 1, further comprising fluid-operated spring elements supporting the driving axles on the framework, a venting and charging valve situated between a pressure-fluid supply system and the spring elements and operatively coupled with several actuating members arranged on th vehicle.

20. A service vehicle according to claim 1, further comprising a transverse impact guard fastened to the main bearer rearwardly of the rear driving axle, the impact guard being displaceable around an axis extending in a longitudinal direction of the vehicle.

21. A service vehicle according to claim 20, further comprising a trailer coupling situated on a transverse bearer of the impact guard.

22. A service vehicle according to claim 1, further comprising a frame member vertically displaceable with respect to the framework, and a securing device for a fire extinguisher pump suspended from the frame member.

* * * * *

UNITED STATES PATENT AND TRADEMARK OFFICE
CERTIFICATE OF CORRECTION

PATENT NO. : 4,683,976

DATED : August 4, 1987

INVENTOR(S) : Walter Hawelka, et al

It is certified that error appears in the above-identified patent and that said Letters Patent is hereby corrected as shown below:

The title page should be deleted to appear as per attached title page.

The drawings consisting of Figures 1-13 should be deleted to be replaced with Figures 1-13 as shown on the attached sheets.

Signed and Sealed this

Thirteenth Day of December, 1988

Attest:

DONALD J. QUIGG

Attesting Officer

Commissioner of Patents and Trademarks

United States Patent [19]

Hawelka et al.

[11] Patent Number: 4,683,976
[45] Date of Patent: Aug. 4, 1987

[54] SERVICE VEHICLE

[75] Inventors: Walter Hawelka, Linz; Hermann Staudinger, Neuhofen, both of Austria

[73] Assignee: Konrad Rosenbauer KG, Leonding, Austria

[21] Appl. No.: 733,515

[22] Filed: May 13, 1985

[30] Foreign Application Priority Data

May 18, 1984 [AT] Austria ................................. 1642/84
Dec. 6, 1984 [AT] Austria ................................. 3870/84

[51] Int. Cl.⁴ ............................................ A62C 27/16
[52] U.S. Cl. .............................. 180/311; 180/53.1; 180/70.1; 180/233; 180/291; 280/781
[58] Field of Search .......... 280/405 R, 406 R, 407, 280/446, 494, 781, 786; 180/311, 70.1, 900, 53.1, 312, 233; 296/203, 204

[56] References Cited

U.S. PATENT DOCUMENTS

| | | | |
|---|---|---|---|
| 1,926,928 | 9/1933 | Yost et al. | 180/291 |
| 1,936,318 | 11/1933 | Windberger | 180/291 |
| 2,796,140 | 6/1957 | Knolle | 180/311 |
| 3,101,150 | 8/1963 | Janson et al. | 180/291 |
| 3,194,335 | 7/1965 | Yué | 180/291 |
| 3,455,404 | 7/1969 | Hansen | 180/291 |
| 3,889,782 | 6/1975 | Geis | 180/291 |
| 4,267,895 | 5/1981 | Eggert, Jr. | 180/291 |
| 4,289,214 | 9/1981 | Spence | 180/311 |
| 4,484,656 | 11/1984 | Bird | 180/291 |

FOREIGN PATENT DOCUMENTS 541369 11/1941 United Kingdom .
885689 12/1961 United Kingdom .

*Primary Examiner*—Richard A. Bertsch
*Attorney, Agent, or Firm*—Kurt Kelman

[57] ABSTRACT

A chassis frame particularly suitable for fire service vehicles comprises a pair of main bearers extending longitudinally and spaced transversely of the vehicles, each including at least one angled portion suitably disposed between the front and rear axles and enclosing an obtuse angle of less than 180° towards the wheels. Engine mounting means are situated rearwardly of the front axle and an engine output shaft is positioned above the axles and between the axles and upper portions of the wheels. This facilitates adaptation to different service vehicle requirements, the installation of drive transmissions and service equipment such as fire fighting equipment whilst allowing for ease of access and flexibility in use.

22 Claims, 13 Drawing Figures